(12) United States Patent
Harada et al.

(10) Patent No.: US 10,045,242 B2
(45) Date of Patent: Aug. 7, 2018

(54) USER TERMINAL, RADIO BASE STATION AND INTER-FREQUENCY MEASUREMENT METHOD

(71) Applicant: NTT DOCOMO, INC., Tokyo (JP)

(72) Inventors: Hiroki Harada, Tokyo (JP); Satoshi Nagata, Tokyo (JP); Hiroyuki Ishii, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 89 days.

(21) Appl. No.: 15/024,874

(22) PCT Filed: Sep. 4, 2014

(86) PCT No.: PCT/JP2014/073286
§ 371 (c)(1),
(2) Date: Mar. 25, 2016

(87) PCT Pub. No.: WO2015/045774
PCT Pub. Date: Apr. 2, 2015

(65) Prior Publication Data
US 2016/0219453 A1 Jul. 28, 2016

(30) Foreign Application Priority Data
Sep. 26, 2013 (JP) .................................. 2013-199191

(51) Int. Cl.
*H04W 4/00* (2018.01)
*H04W 24/10* (2009.01)
(Continued)

(52) U.S. Cl.
CPC .......... *H04W 24/10* (2013.01); *H04B 17/318* (2015.01); *H04L 5/0041* (2013.01);
(Continued)

(58) Field of Classification Search
CPC ...................................................... H04W 24/10
(Continued)

(56) References Cited

U.S. PATENT DOCUMENTS

| | | | |
|---|---|---|---|
| 2015/0092578 A1* | 4/2015 | Ingale | H04W 48/16 370/252 |
| 2015/0139053 A1* | 5/2015 | Van Lieshout | H04W 52/0216 370/311 |

(Continued)

OTHER PUBLICATIONS

International Search Report issued in corresponding application No. PCT/JP2014/073286 dated Dec. 9, 2014 (4 pages).
(Continued)

*Primary Examiner* — Farah Faroul
(74) *Attorney, Agent, or Firm* — Osha Liang LLP

(57) ABSTRACT

The present disclosure is designed to reduce the load of inter-frequency measurements in user terminals in a radio communication system in which a plurality of component carriers (CCs) are used in each small cell within a macro cell. The inter-frequency measurement method of the present disclosure includes the steps of, from a radio base station forming a macro cell to a user terminal, transmitting the transmission timing information of a detection signal in a small cell, and a timing shift value for detection signals of the plurality of CCs that transmitted with shifted timings in the small cell, and, in the user terminal, measuring the plurality of CCs in a measurement gap based on the transmission timing information and the timing shift value.

14 Claims, 17 Drawing Sheets

(51) Int. Cl.
*H04W 52/34* (2009.01)
*H04B 17/318* (2015.01)
*H04L 5/00* (2006.01)
*H04W 28/06* (2009.01)
*H04W 84/04* (2009.01)

(52) U.S. Cl.
CPC .......... *H04W 52/346* (2013.01); *H04W 28/06* (2013.01); *H04W 84/045* (2013.01)

(58) Field of Classification Search
USPC .............................................. 370/252, 395.4
See application file for complete search history.

(56) References Cited

U.S. PATENT DOCUMENTS

| | | | |
|---|---|---|---|
| 2015/0222402 A1* | 8/2015 | Ouchi .................. | H04L 1/00 370/329 |
| 2016/0050598 A1* | 2/2016 | Dalsgaard ......... | H04W 36/0055 370/331 |
| 2016/0174088 A1* | 6/2016 | Yilmaz ............. | H04W 36/0088 455/434 |

OTHER PUBLICATIONS

Written Opinion of the International Searching Authority issued in corresponding application No. PCT/JP2014/073286 dated Dec. 9, 2014 (4 pages).

NTT DOCOMO, "Views on Remaining Issues Regarding Evaluation of Small Cell Discovery"; 3GPP TSG RAN WG1 Meeting #73, R1-132364; Fukuoka, Japan, May 20-24, 2013 (4 pages).

3GPP TR 36.872 V1.0.1, "3rd Generation Partnership Project; Technical Specification Group Radio Access Network; Small cell enhancements for E-UTRA and E-UTRAN—Physical layer aspects (Release 12)"; Aug. 2013 (77 pages).

NTT DOCOMO, "Performance Evaluation for Small Cell Discovery"; 3GPP TSG RAN WG1 Meeting #73, R1-132365; Fukuoka, Japan, May 20-24, 2013 (6 pages).

3GPP TR 36.814 V9.0.0, "3rd Generation Partnership Project; Technical Specification Group Radio Access Network; Evolved Universal Terrestrial Radio Access (E-UTRA); Further advancements for E-UTRA physical layer aspects (Release 9)"; Mar. 2010 (104 pages).

Office Action issued in the counterpart Japanese Patent Application No. 2013-199191, dated Sep. 26, 2017. (6 pages).

\* cited by examiner

USER TERMINAL, RADIO BASE STATION AND INTER-FREQUENCY MEASUREMENT METHOD

TECHNICAL FIELD

The present invention relates to a user terminal, a radio base station and an inter-frequency measurement method in a next-generation mobile communication system in which small cells are placed within a macro cell.

BACKGROUND ART

In LTE (Long Term Evolution) and successor systems of LTE (referred to as, for example, "LTE-advanced," "FRA (Future Radio Access)," "4G," etc.), a radio communication system (referred to as, for example, "HetNet" (Heterogeneous Network)) to place one or more small cells (including pico cells, femto cells and so on) having a relatively small coverage of a radius of approximately several meters to several tens of meters, within a macro cell having a relatively large coverage of a radius of approximately several hundred meters to several kilometers, is under study (see, for example, non-patent literature 1).

Given this radio communication system, a scenario to use the same frequency band F1 in both the macro cell and the small cells as shown in FIG. 1A ("co-channel"), and a scenario to use mutually different frequencies F1 and F2 between the macro cell and the small cells as shown in FIG. 1B ("separated frequencies," "non-co-channel," etc.) are under study. Also, in the scenario illustrated in FIG. 1B, a study is also in progress to use different frequencies F2 and F3 between the small cells.

CITATION LIST

Non-Patent Literature

Non-Patent Literature 1: 3GPP TR 36.814 "E-UTRA Further Advancements for E-UTRA Physical Layer Aspects"

SUMMARY OF INVENTION

Technical Problem

In a radio communication system such as that shown in FIG. 1B, a user terminal detects small cells by carrying out inter-frequency measurements, whereupon communication with the macro cell is interrupted and small cell measurements are executed.

Now, with the radio communication system shown in FIG. 1B, a study is in progress to use a plurality of component carriers (CCs) (also simply referred to as "carriers," "frequencies," etc.) in the small cells. In this case, the user terminal is expected to carry out inter-frequency measurements on a per CC basis. However, when inter-frequency measurements are carried out on a per CC basis, there is a threat that the load in the user terminal increases.

The present invention has been made in view of the above, and it is therefore an object of the present invention to provide a user terminal, a radio base station and an inter-frequency measurement method which can reduce the load of inter-frequency measurements in a radio communication system in which a plurality of CCs are used in each small cell within a macro cell.

Solution to Problem

The inter-frequency measurement method according to the present invention provides an inter-frequency measurement method in a radio communication system in which a plurality of component carriers (CCs) are used in a small cell within a macro cell, and this inter-frequency measurement method includes the steps of from a radio base station forming the macro cell to a user terminal, transmitting the transmission timing information of a detection signal in the small cell, and a timing shift value for detection signals of the plurality of CCs that are transmitted with shifted timings in the small cells, and, in the user terminal, measuring the plurality of CCs in a measurement gap based on the transmission timing information and the timing shift value.

Advantageous Effects of Invention

According to the present invention, it is possible to reduce the load of inter-frequency measurements in user terminals in a radio communication system in which a plurality of CCs are used in each small cell within a macro cell.

DESCRIPTION OF EMBODIMENTS

Figure 1A:
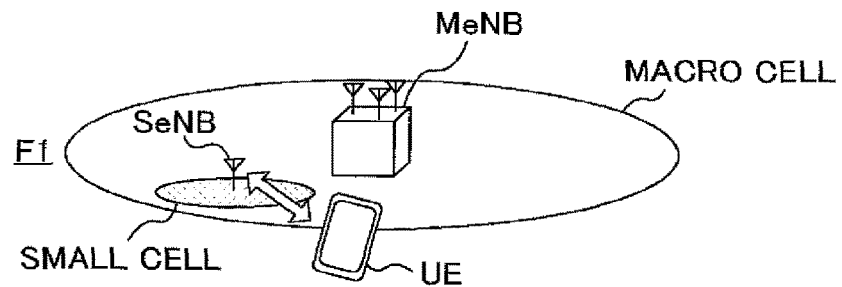
FIG. 1 provides diagrams to explain a radio communication system in which small cells are arranged within a macro cell.
Figure 1B:
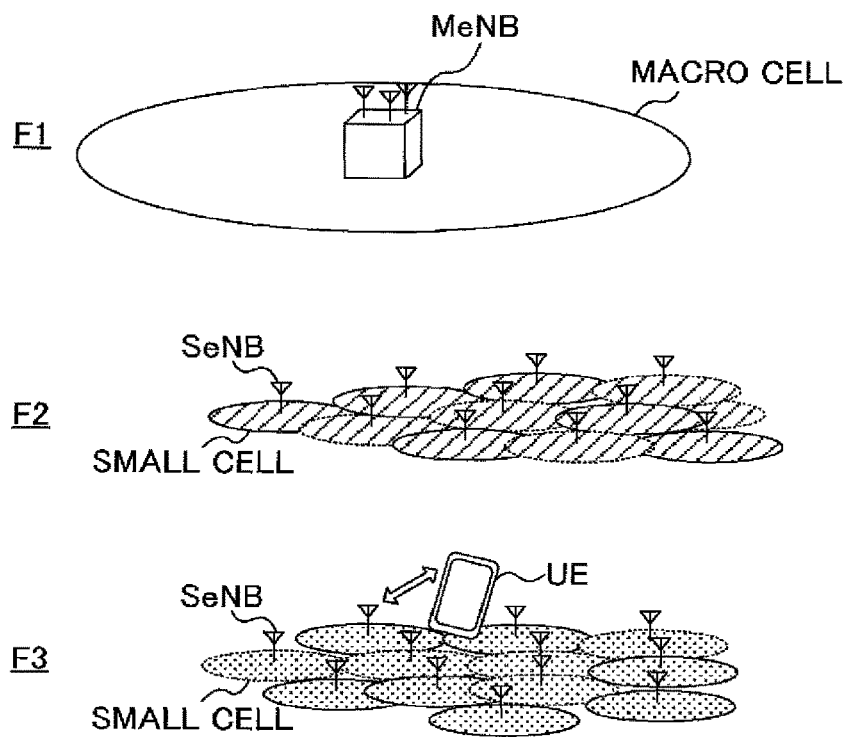
Figure 2:
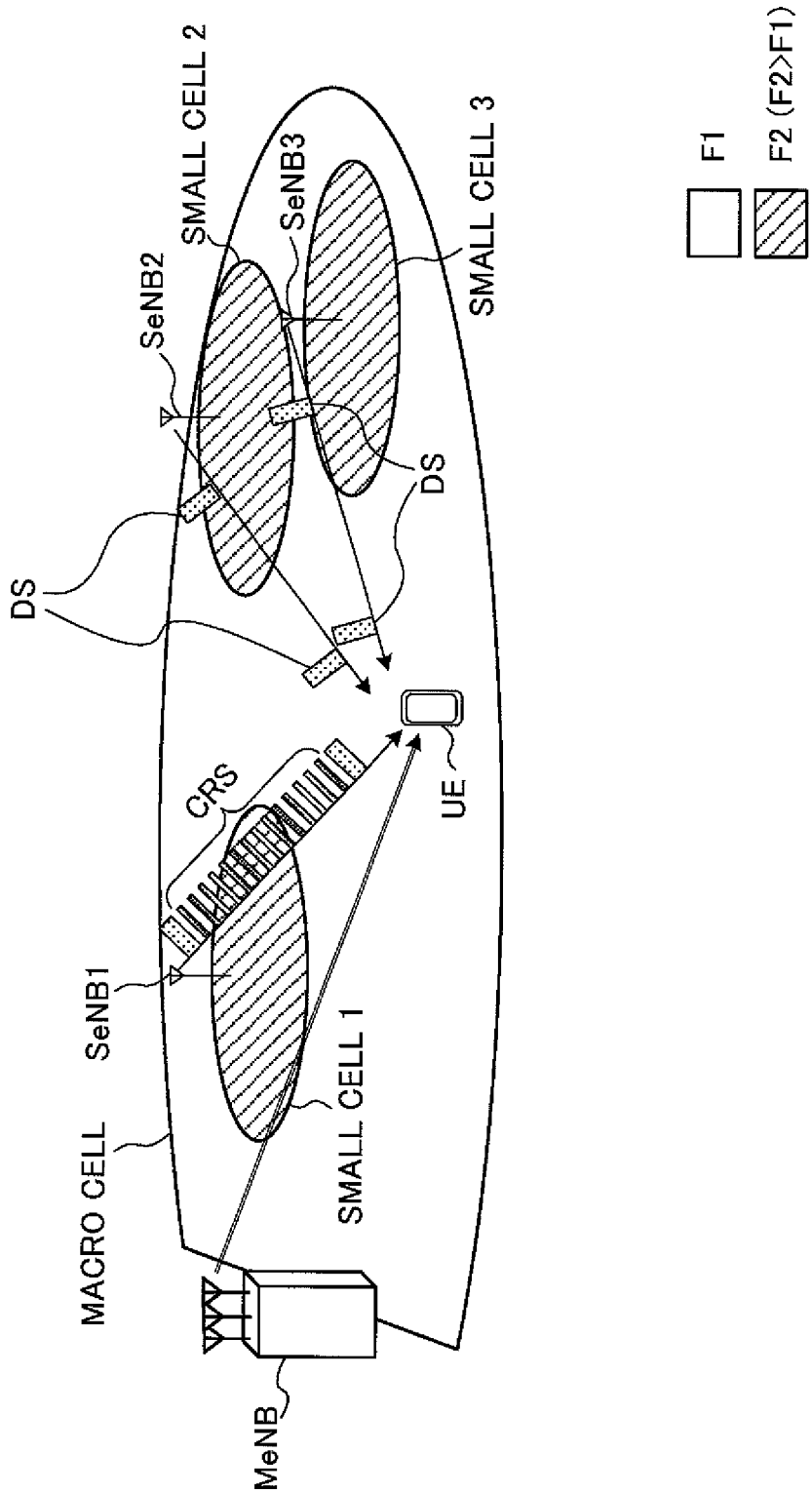
FIG. 2 is a diagram to explain a radio communication system in which the on/off state is switched.

FIG. 2 is a diagram to explain an example of a radio communication system in which small cells are arranged within a macro cell. Referring to FIG. 2, the radio communication system is comprised of a radio base station that forms a macro cell (hereinafter referred to as the "macro base station (MeNB: Macro eNodeB)"), radio base stations 1 to 3 that form small cells (hereinafter referred to as the "small base stations (SeNBs: Small eNodeBs)") 1 to 3, and a user terminal (UE: User Equipment).

In the radio communication system shown in FIG. 2, a relatively low frequency band F1 such as, for example, 2 GHz or 800 MHz is used in the macro cell, and a relatively high frequency band F2 such as, for example, 3.5 GHz or 10 GHz is used in the small cells 1 to 3.

As shown in FIG. 2, when the high frequency band F2 is used in the small cells 1 to 3, the assumption is that the small cells 1 to 3 are placed in a concentrated manner. Consequently, for the radio communication system shown in FIG. 2, a study is in progress to reduce the interference between the small cells, their power consumption and so on by switching the on/off state of the small cells 1 to 3 based on the traffic of the small cells 1 to 3.

Here, the on state refers to the state in which data is transmitted and received, and is also referred to as the "continuous transmission state." For example, in FIG. 2, the small cell 1 (small base station 1) having relatively heavy traffic is in the on state. In the on state, cell-specific reference signals (CRSs: Cell-specific Reference Signals) are transmitted in each subframe, and synchronization signals (PSS (Primary Synchronization Signal) and SSS (Secondary Synchronization Signal)), which are not shown, are transmitted every five subframes.

On the other hand, the off state refers to the state in which data is not transmitted or received, and is also referred to as the "discontinuous transmission (DTX) state." In FIG. 2, the small cells 2 and 3 (small base stations 2 and 3), where the traffic is relatively light, are in the off state. As shown in FIG. 2, in the off state, discovery signals (described later) are transmitted in a longer period than CRSs. In the off state, the transmission of CRSs is omitted, so that it is possible to reduce the interference among the small cells 1 to 3 and the power consumption of the small base stations 2 and 3.

Figure 3:
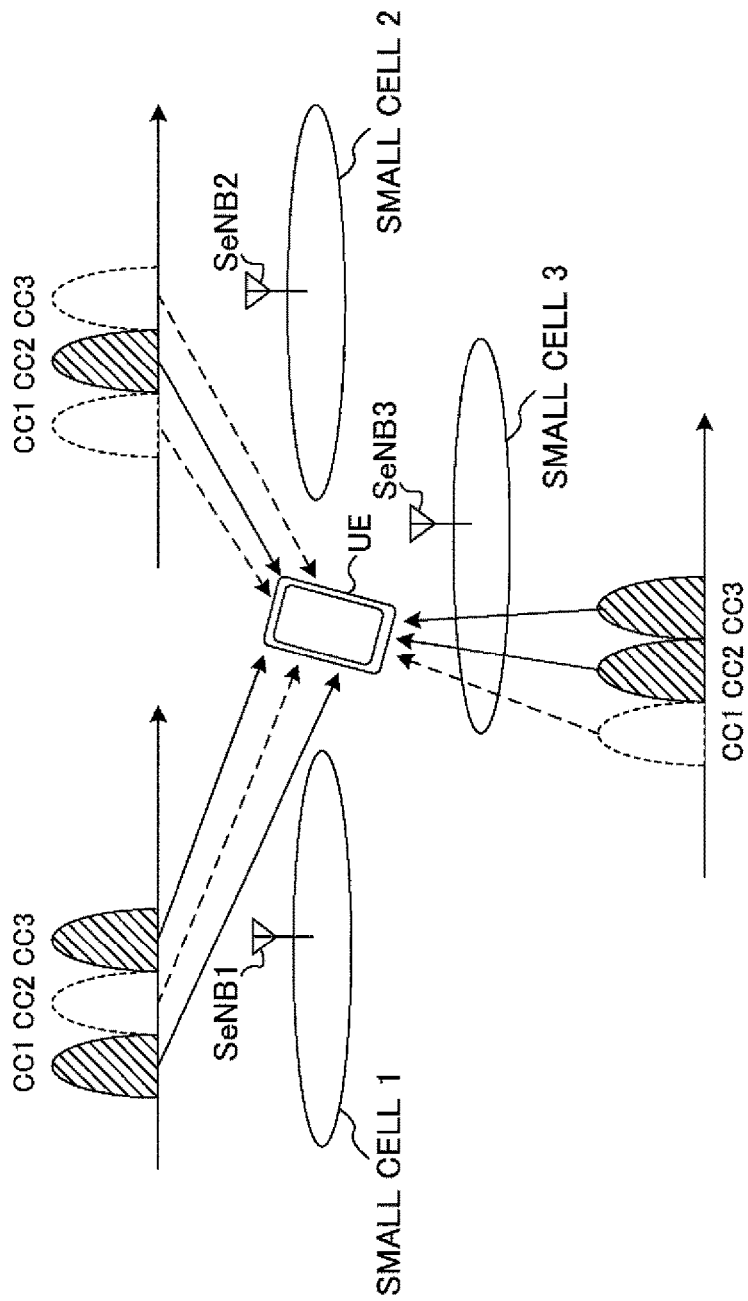
FIG. 3 is a diagram to explain the switching of the on/off state per CC.

Also, as shown in FIG. 3, with the radio communication system shown in FIG. 2, a study is also in progress to support a plurality of component carriers (CCs) in each small cell (small base station) and switch the on/off state on a per CC basis. For example, in FIG. 3, the small cells 1 to 3 each support CC 1 to CC 3. Note that FIG. 3 assumes that CC 1 and CC 3 in the small cell 1 are in the on state, CC 2 in the small cell 2 is in the on state, and CC 2 and CC 3 in the small cell 3 are in the on state.

In FIG. 3, the user terminal is unsure which CCs in the small cells 1 to 3 are in the on state (or in the off state). Consequently, the user terminal needs to measure the received quality (for example, the RSRQ: Reference Signal Received Quality) of CC 1 to CC 3 in each of the small cells 1 to 3. Consequently, if the on/off state is switched per CC in the small cells, the load in the user terminal increases compared to the case of switching the on/off state on a per small cell basis.

Figure 4:
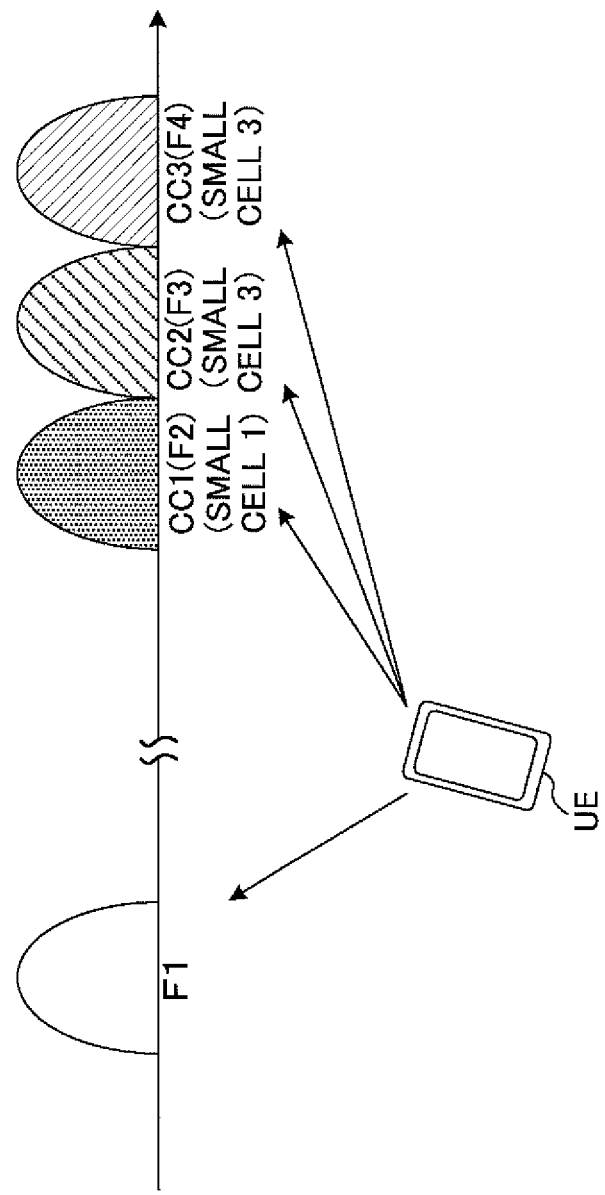
FIG. 4 is a diagram to explain carrier aggregation using CCs in the on state.

Also, when the on/off state of the small cells 1 to 3 is switched on a per CC basis, the user terminal can execute carrier aggregation (CA) by gathering CCs in the on state. In this CA, a plurality of CCs in a single small cell may be gathered, or a plurality of CCs in different small cells may be gathered. For example, in FIG. 4, the CC of the macro cell, which uses the frequency band F1 (for example, 2 GHz), and CC 1 of the small cell 1 and CC 2 and CC 3 of the small cell 3, which use the frequency band F2 (for example, 3.5 GHz), are gathered.

Now, the small cells 1 to 3 of FIG. 3 use different frequency bands from that of the macro cell. Consequently, a user terminal that is connected with the macro cell has to interrupt its communication with the macro cell in order to perform the detection process (cell search) and the received quality measurement process with respect to CC 1 to CC 3 in each of the small cells 1 to 3 (inter-frequency measurements).

In inter-frequency measurements, a user terminal that is connected to the macro base station changes the receiving frequency from the frequency F1 to a different frequency (in FIG. 5, frequency F2 or F3) in measurement gaps (MGs), monitors the synchronization signals (for example, the PSS (Primary Synchronization Signal)/SSS (Secondary Synchronization Signal)) transmitted in that different frequency, and detects small cells. Also, the user terminal measures the received power (RSRP: Reference Signal Received Power) in that different frequency by using the detected small cells' cell-specific reference signals (CRSs).

Figure 5:
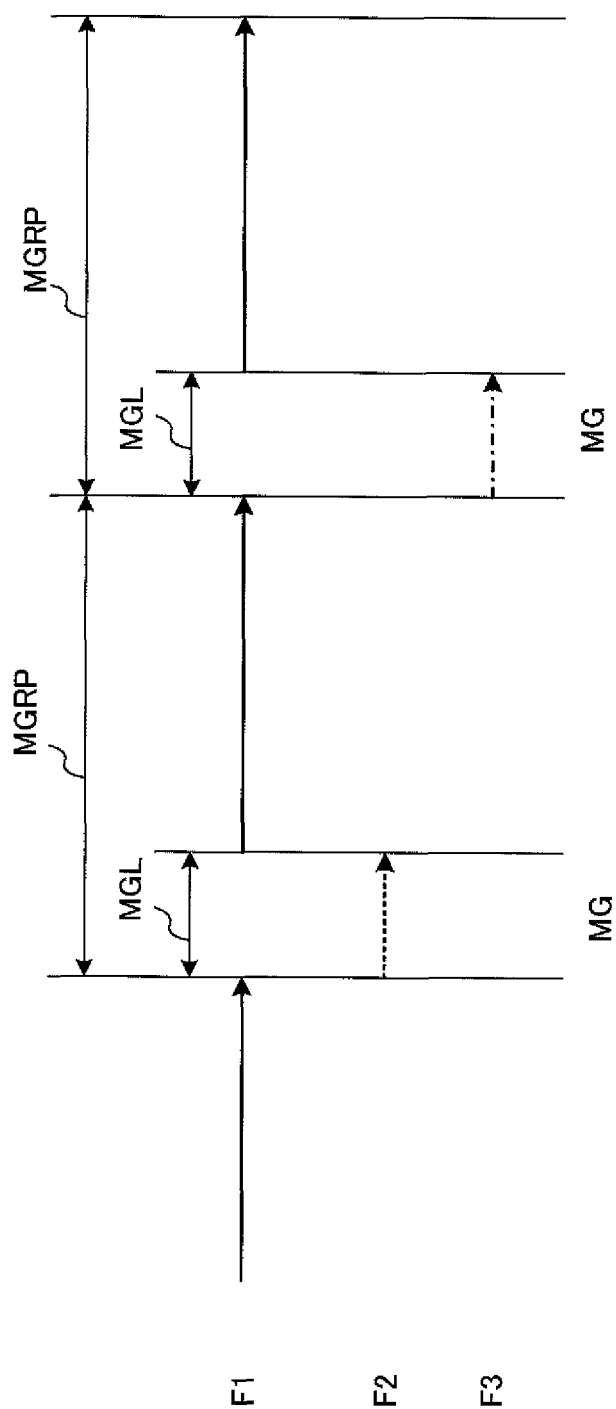
FIG. 5 is a diagram to explain an example of an inter-frequency measurement method.

FIG. 5 is a diagram to explain an example of inter-frequency measurements. As shown in FIG. 5, the measurement gaps (MGs) have a predetermined length of time (MGL: Measurement Gap Length), and are repeated in a predetermined period (MGRP: Measurement Gap Repetition Period). For example, in FIG. 5, the length of time of measurement gaps (MGs) 1 to 3 may be 6 ms, and the predetermined period (MGRP) may be 40 ms or 80 ms.

In FIG. 5, the PSSs/SSSs of the frequencies F2 and F3 are each transmitted in a 5-ms period. Consequently, the user terminal monitors the PSSs/SSSs of the frequencies F2 and F3 in 5-ms units, and detects small cells. Meanwhile, since the length of time of the measurement gaps in FIG. 5 is 6 ms, only the PSS/SSS of one frequency can be monitored in one measurement gap, and only small cells of one frequency can be detected. Consequently, in the measurement gaps of FIG. 5, the process of detecting small cells of different frequencies is performed in every measurement gap.

When, as shown in FIG. 5, inter-frequency measurements are executed with respect to varying frequencies (CC) in every measurement gap, the time required for inter-frequency measurements increases in proportion to the number of frequencies (CCs) to measure. For example, the time required for inter-frequency measurements when the measurement gap period (MGRP: Measurement Gap Repetition Period) is 40 ms is 3.84 seconds if inter-frequency measurements are carried out with respect to one frequency (CC), but becomes 11.52 seconds if inter-frequency measurements are carried out with respect to three frequencies (CCs).

In this way, when inter-frequency measurements are carried out with respect to varying frequencies (CCs) in every measurement gap, the time required for inter-frequency measurements increases. As a result of this, there is a threat that the load in the user terminal increases, the time communication with the macro cell is interrupted increases, and the throughput in the macro cell decreases.

So, a study is in progress to carry out inter-frequency measurements for specific CCs, instead of all CCs (frequencies). This is because, in a given small cell, the received power (for example, the RSRP) of the desired signal of a specific CC can be estimated to be the same as the received power of the desired signals of the other CCs. Meanwhile, since, as shown in FIG. 3, each small cell's on/off state is switched on a per CC basis, it is not possible to estimate the total received power (for example, the RSSI: Received Signal Strength Indicator) of a specific CC to be the same as the total received power of the other CCs.

Also, the received quality of each CC (for example, the RSRQ) is calculated based on the ratio of the received power (for example, the RSRP) of the desired signal of each CC and the total received power (for example, the RSSI). Consequently, to measure the received quality of all CCs (for example, the RSRQ), the total received power needs to be measured with respect to all of these CCs. That is, in order to measure the received quality of a plurality of CCs, it is preferable to carry out inter-frequency measurements of a plurality of CCs, instead of carrying out inter-frequency measurements with respect to specific CCs.

So, the present inventors have worked on an inter-frequency measurement method which can carry out inter-frequency measurements of a plurality of CCs while reducing the load of user terminals in a radio communication system in which a plurality of CCs are used in each small cell within a macro cell, and arrived at the present invention. Now, inter-frequency measurement methods according to first and second aspects of the present invention will be described below.

(First Aspect)

In the inter-frequency measurement method according to the first aspect, a macro base station transmits, to a user terminal, the transmission timing information of discovery signals in a small cell, and the timing shift values for the discovery signals of a plurality of CCs, which are applied timing shifts in the small cell and transmitted. The user terminal measures a plurality of CCs, in measurement gaps, based on the transmission timing information and the timing shift values.

With the inter-frequency measurement method according to the first aspect, transmission timing information and timing shift values are transmitted from the macro base station, so that the user terminal can measure a plurality of CCs in one measurement gap, and therefore it is possible to reduce the load of the user terminal.

Here, the discovery signals refer to detection signal for use in the small cell detection process. Also, the discovery signals may be measurement signals to use in the process of measuring received quality (for example, the RSRQ) in small cells. Also, the discovery signals may be stipulated based on reference signals such as CRSs, CSI-RSs (Channel State Information-Reference Signal), PRSs (Positioning Reference Signals) and so on, or may be stipulated based on synchronization signal such as the PSS/SSS, or new signals may be stipulated. Also, in subframes, the discovery signals may be arranged in a higher density than the PSS/SSS, CRSs and/or others.

Also, measurements of a plurality of CCs may include at least one of the process of detecting small cells by using the discovery signals of these plurality of CCs, the process of measuring received power (for example, the RSRP) and received quality (for example, the RSRQ) by using the discovery signals of these plurality of CCs, and the process of measuring the total received power (for example, the RSSI) of these plurality of CCs.

Figure 6:
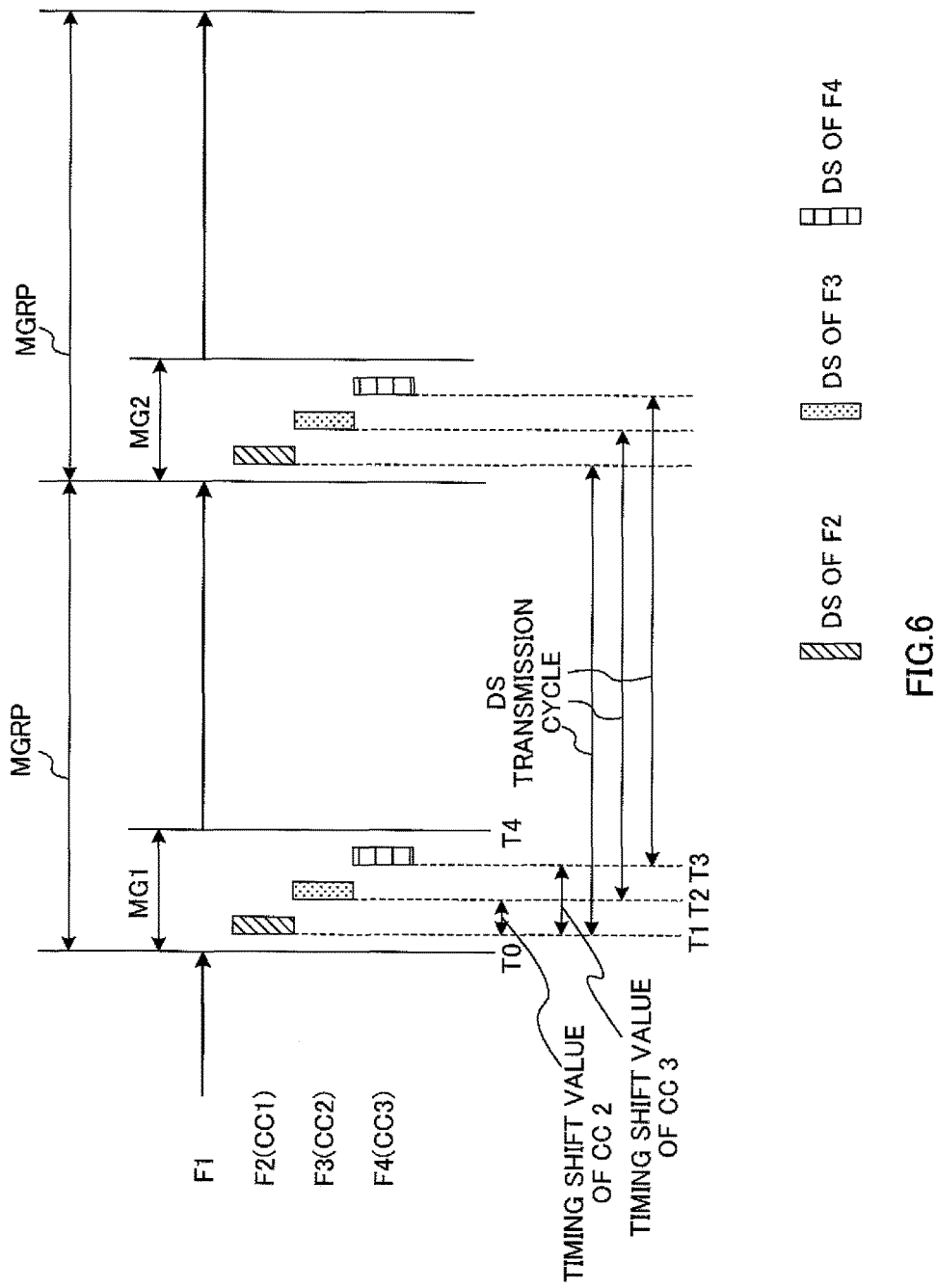
FIG. 6 is a diagram to explain an inter-frequency measurement method according to a first aspect.

With reference now to FIGS. 6 to 10, the inter-frequency measurement method according to the first aspect will be described in detail. FIG. 6 is a diagram to explain the inter-frequency measurement method according to the first aspect. As shown in FIG. 6, with the inter-frequency measurement method according to the first aspect, the discovery signals of a plurality of CCs (frequencies) are applied timing shifts and transmitted. Note that these discovery signals of a plurality of CCs may be transmitted in a single small cell, or may be transmitted in a plurality of small cells.

For example, in FIG. 6, the discovery signals of CC 1 to CC 3 (frequencies F2 to F4) are transmitted at shifted timings T1 to T3. The macro base station transmits, to the user terminal, the transmission timing information of the discovery signals and the timing shift value for each CC's discovery signal. Based on the transmission timing information and the timing shift values from the macro base station, the user terminal specifies the transmission timings T1 to T3 of the discovery signals of CC 1 to CC 3.

Here, the transmission timing information is information that indicates the transmission timings of the discovery signals in the small cell. The transmission timing information may include at least one of the transmission cycle of discovery signals (DS transmission cycle), the transmission durations of discovery signals (DS transmission durations), and the starting offsets of these transmission durations. Note that the DS transmission cycle is a longer period than that of PSS/SSS, CRSs and/or others, and may be, for example, 100 ms, 160 ms and so on. Also, the DS transmission durations last, for example, 1 ms. Also, the starting offsets may be subframe numbers.

The timing shift values are the timing shift values to apply to the discovery signals of each CC, applied against the transmission timings specified with the transmission timing information. For example, it is possible to determine timing shift values based on the DS transmission duration (for example, 1 ms) and the time to switch the receiving frequency (for example, maximum 0.5 ms). Note that the timing shift values may be referred to as offset values and so on.

For example, in FIG. 6, the transmission timing information indicates the timing T1, the timing shift value for CC 1 is 0 ms. Also, the timing shift value for CC 2 is the sum value (for example, 1.5 ms) of the DS transmission duration of CC 1 (for example, 1 ms) and the time to switch from CC 1 to CC 2 (for example, 0.5 ms). Also, the timing shift value for CC 3 is the value given by adding the sum value of the DS transmission duration of CC 2 and the time to switch from CC 2 to CC 3, to the timing shift value of CC 2 (for example, 3 ms).

Note that each CC's timing shift value is not limited to those illustrated in FIG. 6. Although each discovery signal is shifted evenly in FIG. 6, it is not necessary to shift each discovery signal evenly. Also, the transmission timing information and the timing shift values may be reported to the user terminal via, for example, higher layer signaling such as RRC signaling, or may be reported as cell-specific information. Also, the transmission timing information and the timing shift values may be transmitted as discovery signal configuration information (DS configuration information), along with discovery signal sequence patterns.

Also, in FIG. 6, the macro base station generates measurement gap (MG) configuration information on a per user terminal basis, and transmits the MG configuration information generated. For example, the MG configuration information may be transmitted to the user terminal through higher layer signaling such as RRC signaling. The user terminal configures measurement gaps based on the MG configuration information from the macro base station.

Here, the MG configuration information may include the length of time of the measurement gaps (MGL: Measurement Gap Length) and the period of the measurement gaps (MGRP: Measurement Gap Repetition Period), or include a pattern identifier (gap pattern ID) that identifies the combination of the MGL and the MGRP. Also, the MG configuration information may include offsets for the measurement gaps (gap offsets). Note that these offsets may be subframe numbers.

To be more specific, the macro base station may generate MG configuration information based on the transmission timing information and the timing shift values of the discovery signals, so that the transmission timings of the discovery signals of a plurality of CCs are included in the measurement gaps. For example, in FIG. 6, the MGRP is configured the same as the DS transmission cycle.

Also, in FIG. 6, the user terminal specifies the transmission timings T1 to T3 of the discovery signals of CC 1 to CC 3 based on the transmission timing information and the timing shift values from the macro base station. Also, the user terminal configures measurement gaps based on the MG configuration information from the macro base station, monitors CC 1 to CC 3 in order in the measurement gaps configured, and detects the discovery signals of CC 1 to CC 3.

For example, in FIG. 6, when the measurement gaps are 6 ms and each DS transmission duration is 1 ms, the user terminal switches the receiving frequency from the frequency F1 to the frequency F2 (CC 1) before the timing T1. The user terminal monitors the frequency F2 for 1 ms from the timing T1, and switches the receiving frequency from the frequency F2 to the frequency F3 (CC 2) before the timing T2. The user terminal monitors the frequency F3 for 1 ms from the timing T2, and switches the receiving frequency from the frequency F3 to the frequency F4 (CC 3) before the timing T3. The user terminal monitors the frequency F4 for 1 ms from the timing T3, and switches the receiving frequency from the frequency F4 to the frequency F1 before the timing T4.

In this way, when discovery signals are transmitted at timings shifted on a per CC basis in a measurement gap, the user terminal can detect the discovery signals of a plurality of CCs in one measurement gap. Consequently, when inter-frequency measurements are carried out with respect to a plurality of CCs, it is possible to reduce the load of user terminals, and, furthermore, reduce the time communication with the macro cell is interrupted. In particular, in FIG. 6, inter-frequency measurements for a plurality of CCs can be carried out without changing the length of time (MGL) or the period (MGRP) of measurement gaps.

Figure 7:
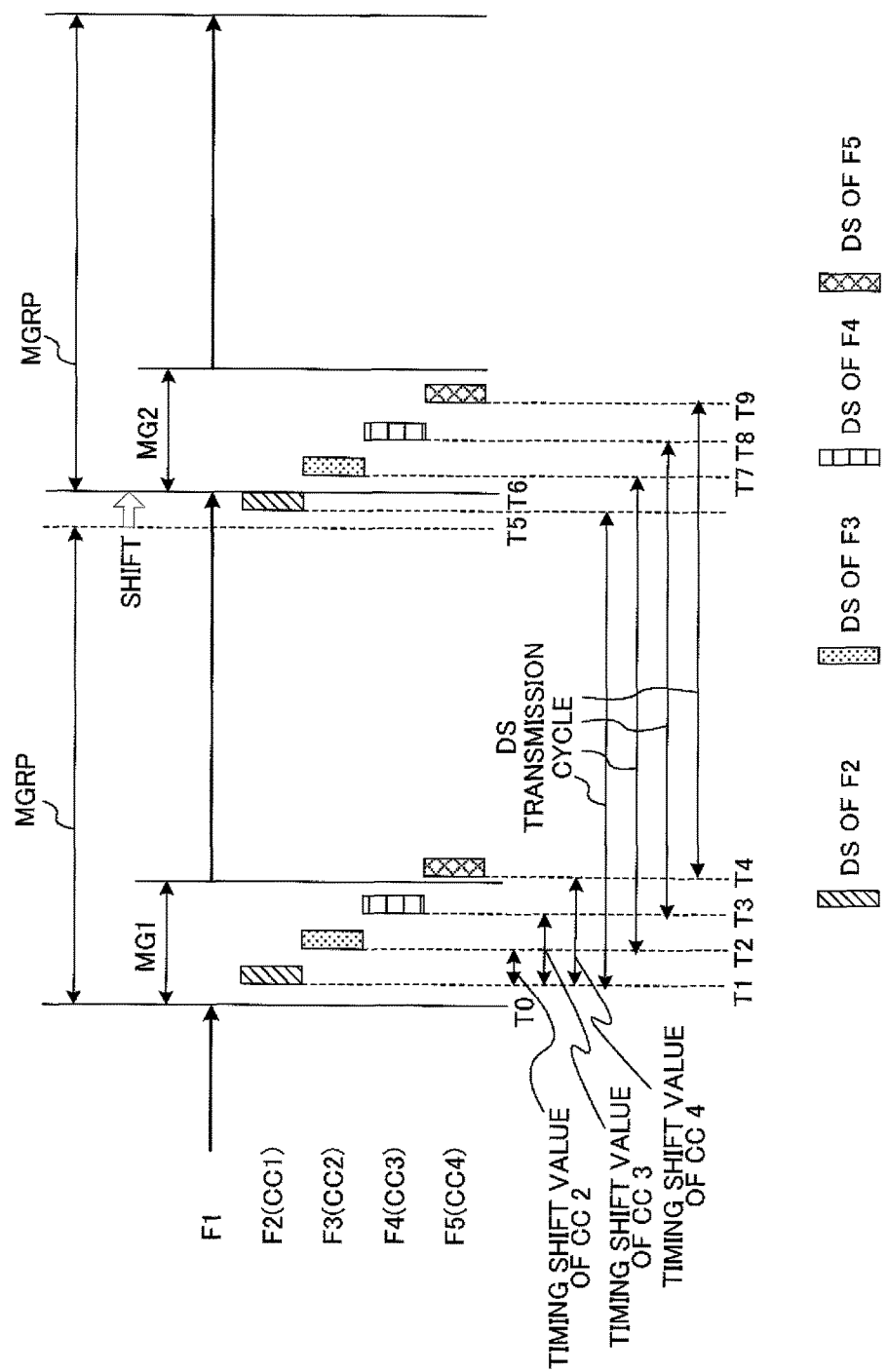
FIG. 7 is a diagram to explain the timing shift of measurement gaps according to the first aspect.
Figure 8:
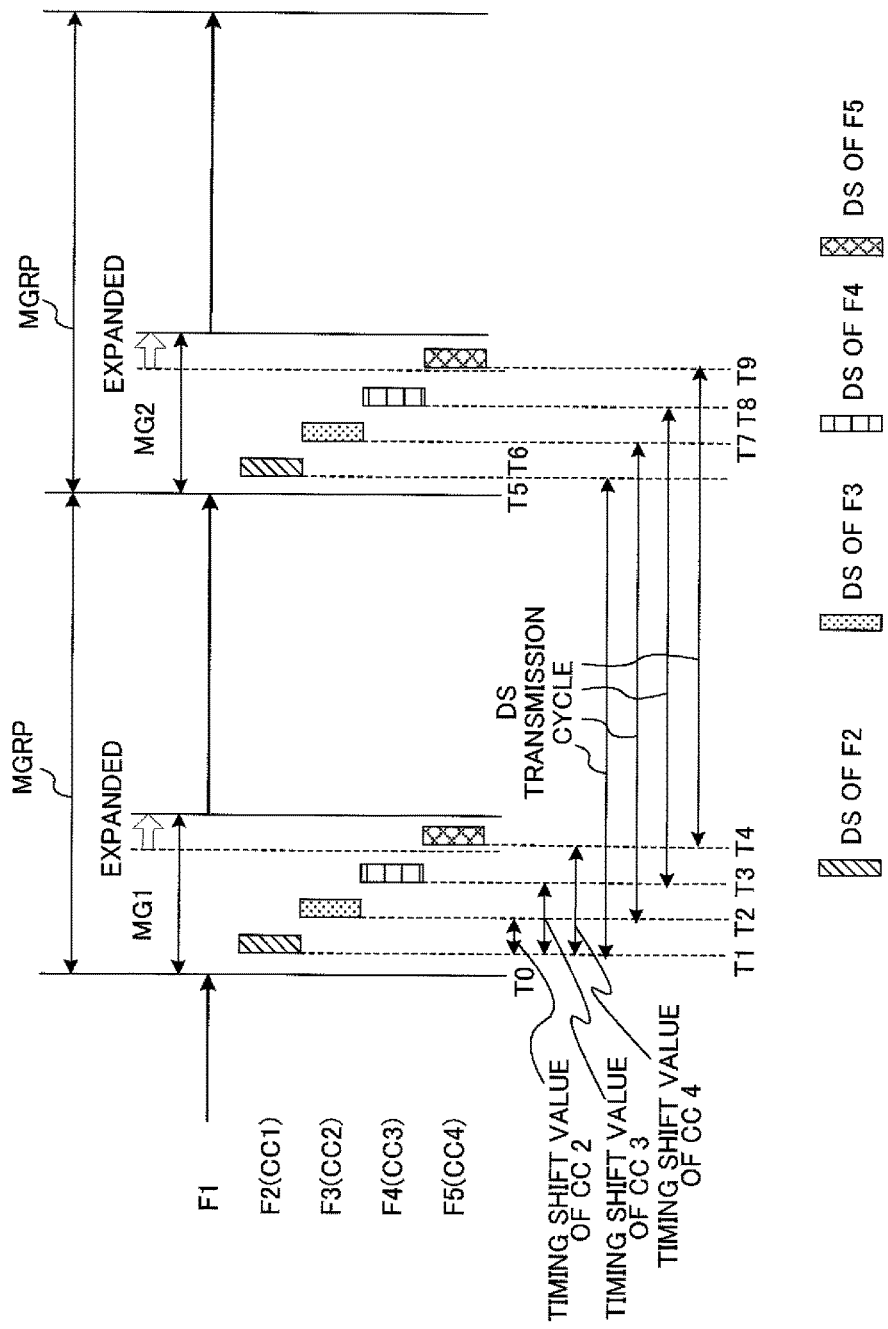
FIG. 8 is a diagram to explain the expansion of measurement gaps according to the first aspect.

Next, the timing shift or expansion of measurement gaps in the inter-frequency measurement method according to the first aspect will be described with reference to FIG. 7 and FIG. 8. FIG. 7 is a diagram to explain the timing shift of measurement gaps according to the first aspect. FIG. 8 is diagram to explain the expansion of measurement gaps according to the first aspect. The following description will primarily focus on differences from FIG. 6.

When, as shown in FIG. 7, the discovery signals of CC 1 to CC 4 (frequencies F2 to F5) are transmitted in the shifted timings T1 to T4, it may occur that the user terminal is unable to monitor all of CC 1 to CC 4 in one measurement gap (for example, 6 ms). For example, the transmission timing T4 of CC 4 is not included in the measurement gap 1 in FIG. 7.

So, the user terminal shifts the measurement gaps based on the timing shift values from the macro base station. By shifting the measurement gaps, it is possible to change the combination of a plurality of CCs to monitor in the measurement gaps. For example, in FIG. 7, the user terminal shifts the starting timing of the measurement gap 2 from the timing T5 to the timing T6. By this means, in the measurement gap 2, unlike the measurement gap 1, the discovery signals of CC 2 to CC 4 (frequencies F3 to F5) can be monitored.

Note that, in FIG. 7, the user terminal may change the period of the measurement gaps (MGRP) based on timing shift values from the macro base station, change the length of time of the measurement gaps (MGL), or change the offsets of the measurement gaps (gap offsets). Also, although, in FIG. 7, every one measurement gap is shifted, it is equally possible to apply shifts every several measurement gaps.

In this way, when measurement gaps are shifted based on timing shift values from the macro base station, it is possible to change the combination of a plurality of CCs to monitor in the measurement gaps. Consequently, even when all CCs cannot be monitored in one measurement gap, it is possible to carry out inter-frequency measurements for a plurality of CCs without expanding the length of time of measurement gaps (MGL).

Also, as shown in FIG. 8, the user terminal may expand the measurement gaps based on timing shift values from the macro base station. To be more specific, the user terminal may make the length of time of the measurement gaps (MGL) longer so that all CCs (frequencies) can be monitored. For example, in FIG. 8, the MGL of the measurement gaps 1 and 2 is made longer, based on timing shift values, so that CC 1 to CC 4 (frequencies F2 to F5) are included. By this means, inter-frequency measurements for all of CC 1 to CC 4 can be carried out. By this means, even if the number of CCs to monitor increases, it is still possible to monitor all CCs in one measurement gap.

Next, with reference to FIG. 9, the measurements of the received power and total received power of discovery signals in the inter-frequency measurement method according to the first aspect will be described. Note that, in the following description, the RSRP will be measured as the received power of discovery signals, the RSRQ will be measured as the received quality of discovery signals, and the RSSI will be measured as the total received power including data signals, interference signals and so on, but these are by no means limiting.

Note that the RSRP is the received power per resource element where a discovery signal is arranged. Also, the RSSI is the total received power per resource block. Also, the RSRQ may be calculated by, for example, the equation "RSRQ=(N*RSRP)/RSSI." Note that, in the above equation, N is a parameter to represent the bandwidth, and may be, for example, the number of resource blocks.

Figure 9:
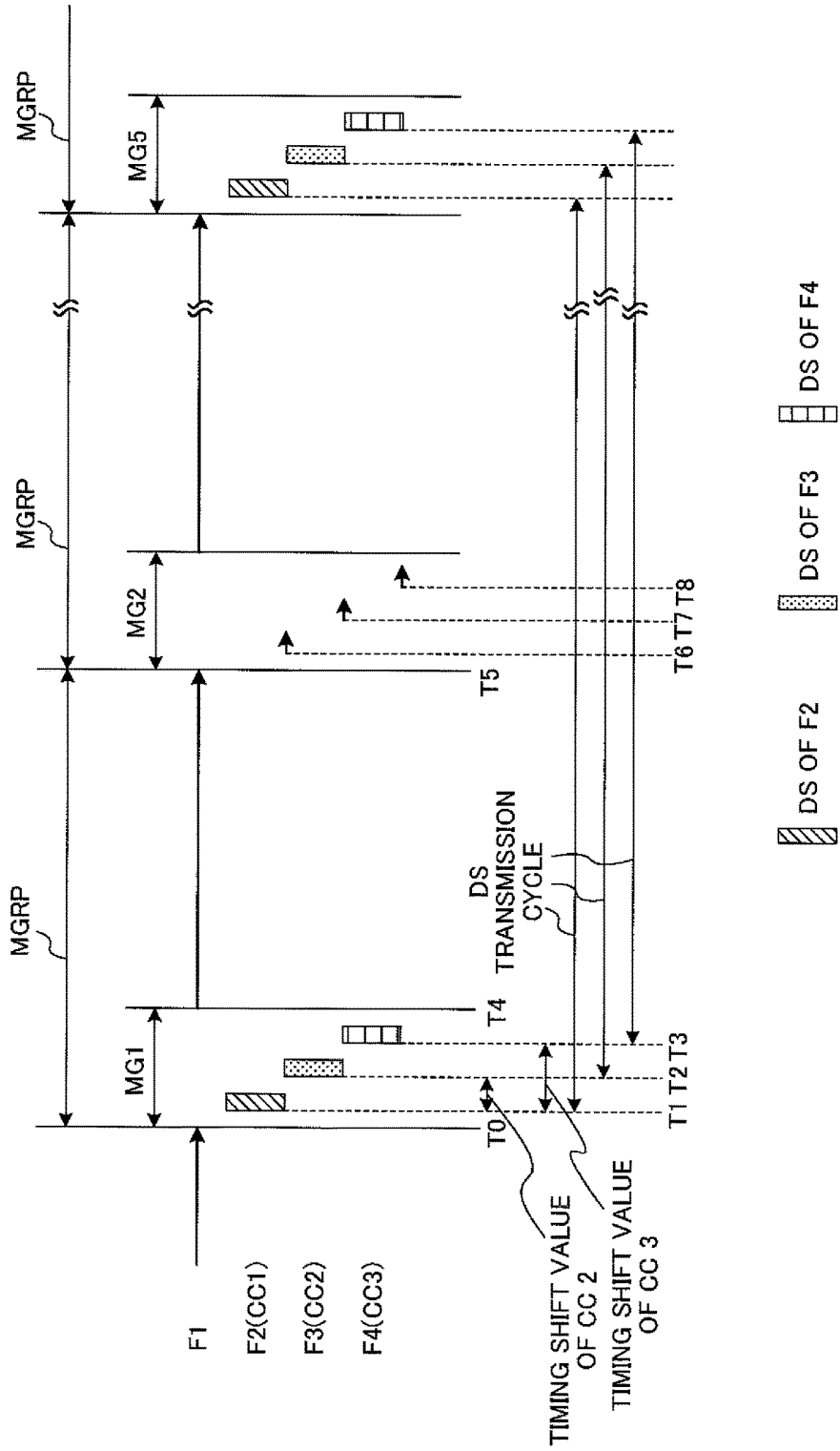
FIG. 9 is a diagram to explain RSRP and RSSI measurements according to the first aspect.

FIG. 9 is a diagram to explain RSRP and RSSI measurements according to the first aspect. FIG. 9 assumes a case where the DS transmission cycle of CC 1 to CC 3 (frequencies F2 to F4) is longer than the measurement gap period (MGRP). For example, in FIG. 9, the MGRP is 40 ms and the DS transmission cycle is 160 ms (a multiple of the MGRP, and four times bigger in this case).

As mentioned earlier, the RSRP is the received power per resource element where a discovery signal is arranged. Consequently, in FIG. 9, in measurement gaps (MG 1 and MG 5) in which discovery signals are transmitted, the user terminal measures each CC's RSRP by using each CC's discovery signal.

Meanwhile, the RSSI is the total received power per resource block, and, preferably, mirrors the traffic. Here, in subframes in which discovery signals are arranged, data signals and other signals may not be arranged. Consequently, when the RSSI is measured in subframes in which discovery signals are arranged, there is a threat that the RSSI cannot mirror the traffic and lowers the accuracy of the RSRQ.

So, when no discovery signal is transmitted in a measurement gap, the user terminal may measure each CC's RSSI in this measurement gap (MG 2). For example, in the measurement gap 2 of FIG. 9, the user terminal may measure the RSSIs of CC 1 to CC 3 in one measurement gap by switching the receiving frequency from CC 1 to CC 3 (frequencies F2 to F4) in order at the timings T6 to T8.

Also, when discovery signals are transmitted in measurement gaps, the user terminal may measure the RSSI of each CC in the measurement gaps (MG 1 and MG 5). This is because, when data signals and other signals are arranged in subframes in which discovery signals are arranged, the RSSI mirrors the traffic.

Next, a case will be described with reference to FIG. 10 where, in the inter-frequency measurement method according to the first aspect, the discovery signals of a plurality of CCs are transmitted in a plurality of small cells. FIG. 10 is a diagram to explain the relationships between a plurality of small cells and the discovery signals of a plurality of CCs in the inter-frequency measurement method according to the first aspect. Note that, in FIG. 10, the inter-frequency measurement method having been described with reference to FIGS. 6 to 9 may be combined as well.

Figure 10A:
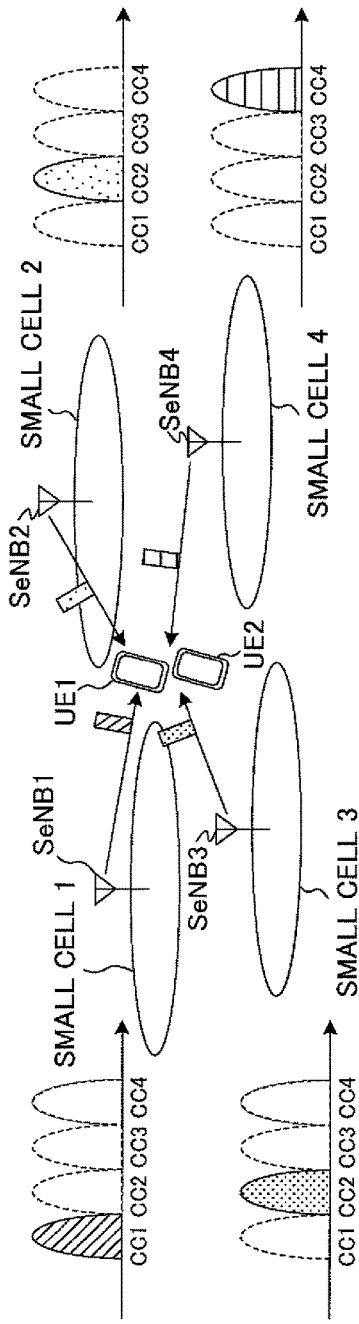
FIG. 10 is a diagram to explain the relationships between a plurality of small cells and the discovery signals of a plurality of CCs according to the first aspect.

Note that, referring to FIG. 10A, when CC 1 to CC 4 are employed in each small cell, the discovery signals of part of the CCs are transmitted in each small cell. For example, in FIG. 10A, the discovery signal of CC 1 is transmitted in the small cell 1, the discovery signal of CC 2 is transmitted in the small cell 2, the discovery signal of CC 2 is transmitted in the small cell 3, and the discovery signal of CC 4 is transmitted in the small cell 4. Note that, although not illustrated, it is equally possible to transmit the discovery signals of all of CC 1 to CC 4 in each small cell.

Figure 10B:
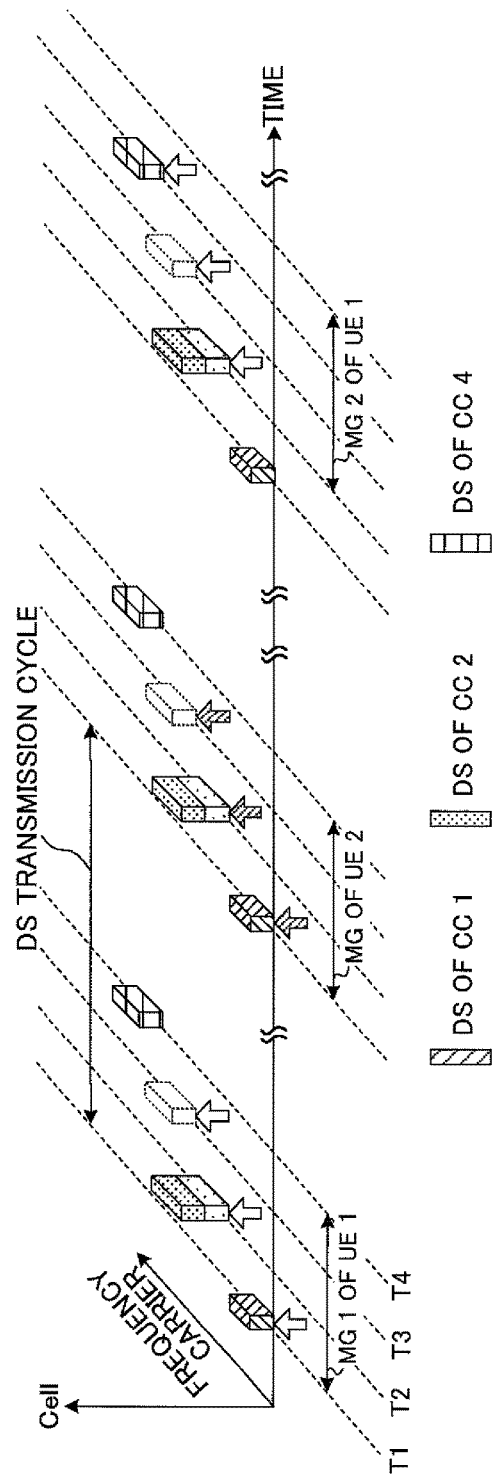

FIG. 10B shows the transmission timings of the discovery signals of the small cells 1 to 4 of FIG. 10A. As shown in FIG. 10B, among the neighbor small cells 1 to 4, the discovery signal of the same CC are transmitted synchronously. For example, in FIG. 10B, the discovery signal of CC 2 in the small cells 2 and 3 are transmitted synchronously at the timing T2.

Synchronous transmission in this case has only to multiplex the discovery signals of the same CC of a plurality of small cells in a predetermined duration (for example, 1 ms) from a predetermined timing, and these discovery signals need not be transmitted at completely the same timing. For example, referring to FIG. 10B, in the DS transmission duration from the timing T2, the discovery signals of CC 2 in the small cells 2 and 3 may be code-division-multiplexed or time-division-multiplexed, or may be frequency-division-multiplexed in CC 2.

Also, as shown in FIG. 10, in the neighbor small cells 1 to 4, the discovery signals of varying CCs are transmitted at timings shifted on a per CC basis. In this case, the macro base station (not shown) may generate transmission timing information and timing shift values that are common among the small cells 1 to 4, and report these to the small base stations 1 to 4.

Also, although the discovery signal of CC 3 is shown at the timing T3 in FIG. 10B, in FIG. 10A, the discovery signal of CC 3 is transmitted in none of the small cells 1 to 4. Consequently, at the timing T3 in FIG. 10B, the discovery signal of CC 3 is not transmitted. Note that the timing T3 can nevertheless be used to transmit the discovery signal of CC 3.

Next, with reference to FIG. 10B, the relationships between the measurement gaps of a plurality of user terminals in the inter-frequency measurement method according to the first aspect will be described. As shown in FIG. 10B, the macro base station may make the timings of measurement gaps on a per user terminal basis.

For example, referring to FIG. 10B, the measurement gaps 1 and 2 for the user terminal 1 are configured in different timings from the measurement gap of the user terminal 2. By using varying measurement gap offsets (gap offsets), the macro base station can make the timings of the measurement gaps of the user terminal 1 and 2 different.

In this way, by making the timings of measurement gaps different on a per user terminal basis, the time to interrupt communication with the macro cell can be made different per user terminal, so that it is possible improve the efficiency of communication in the macro cell.

Note that, as has been described with reference to FIG. 7, in FIG. 10B, the user terminal 1 may shift the measurement gap 2 so that the combination of a plurality of CCs to monitor in the user terminal 1 is changed. By this means, the user terminal monitors the discovery signals of CC 1 to CC 3 (frequencies F2 to F4) in the measurement gap 1, and, meanwhile, in the shifted measurement gap 2, can monitor the discovery signals of CC 2 to CC 4 (frequencies F3 to F5).

(Second Aspect)

With the inter-frequency measurement method according to the second aspect of the present invention, the macro base station transmits, to the user terminal, detection duration information, which represents the discovery signal detection durations (hereinafter referred to as "DS detection durations") in the small cells, and CC information, which represents specific CCs to be monitored in the DS detection durations. The user terminal can configure the DS detection durations based on the detection duration information from the macro base station, and, in these DS detection durations, measures the specific CCs indicated in the CC information from the macro base station.

Note that the measurements of specific CCs may include the process of detecting small cells by using the discovery signals of specific CCs, and the process of measuring received power (for example, the RSRP) by using the discovery signals of these specific CCs.

Figure 11:
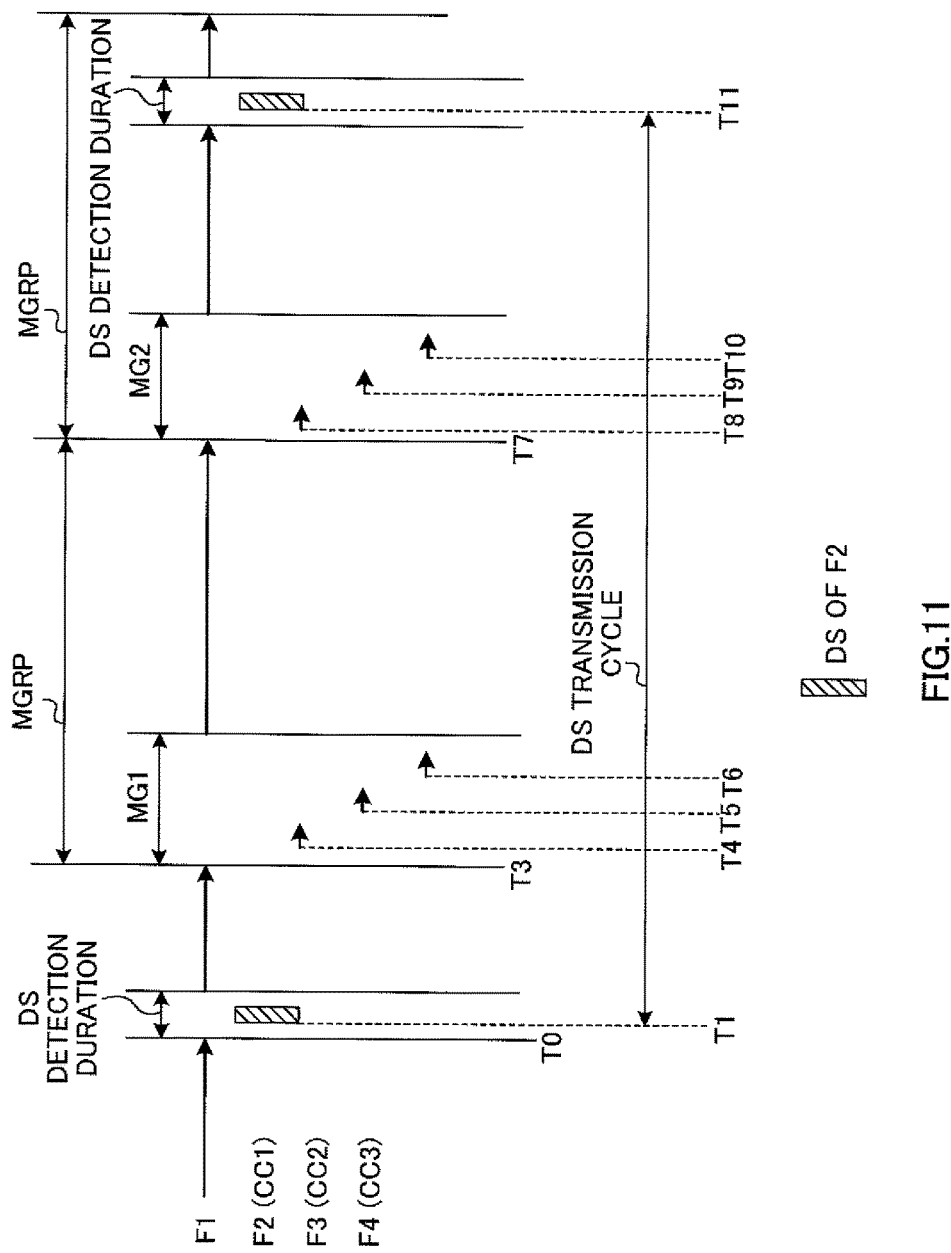
FIG. 11 is a diagram to explain an inter-frequency measurement method according to a second aspect.

With reference to FIG. 11, the inter-frequency measurement method according to the second aspect will be described in detail. The following description will primarily focus on differences from the inter-frequency measurement method according to the first aspect. FIG. 11 is a diagram to explain the inter-frequency measurement method according to the second aspect. As shown in FIG. 11, in the inter-frequency measurement method according to the second aspect, DS detection durations to match the transmission timings of the discovery signals are provided apart from the measurement gaps.

In FIG. 11, the macro base station transmits, to the user terminal, detection duration information to represent the timings of DS detection durations, and CC information to represent the CCs (frequencies) to monitor in these DS detection durations. The detection duration information and CC information may be transmitted to the user terminal via higher layer signaling such as RRC signaling, or may be reported as cell-specific information.

Here, the detection duration information includes at least one of the length of time of DS detection durations, the period of DS detection durations and the starting offsets of DS detection durations. Note that the length of time of the DS detection durations may be configured based on the length of time of the DS transmission durations and the time to switch the receiving frequency. The period of the DS detection durations may be the same as the DS transmission cycle.

Also, in FIG. 11, the user terminal configures DS detection durations in the timings T0 and T11 based on the detection duration information from the macro base station. Also, in the DS detection durations, the user terminal monitors the CC 1 (frequency F2), which is specified in the CC information from the macro base station, and detects the discovery signal of this CC 1. The user terminal measures the RSRP by using the detected discovery signal.

Also, in FIG. 11, the user terminal configures the measurement gap 1 in the timing T3 based on the MG configuration information from the macro base station. The user terminal monitors CC 1 to CC 3 (F2 to 4) in the timings T4 to T6 in the measurement gap 1 and measures the RSSIs of CC 1 to CC 3. Likewise, the user terminal configures the measurement gap 2 and measures the RSSIs of CC 1 to CC 3.

Here, the RSRP of each CC in a specific small cell is estimated to be substantially equal. Consequently, in FIG. 11, the RSRP of CC 1 (frequency F2) is measured in the DS detection durations, and the RSRPs of CC 2 and CC 3 (frequencies F3 and F4) are estimated to be equal to the RSRP of CC 1, without measurements. By this means, the user terminal can calculate the RSRQs of CC 1 to CC 3, based on the RSRP of CC 1 measured in DS detection durations and the RSSIs of CC 1 to CC 3, measured in measurement gaps.

Note that, although not illustrated, in the timing T1 in FIG. 11, not only the discovery signal of CC 1 (frequency F2), but also the discovery signals of CC 2 and CC 3 (frequencies F3 and F4) may be transmitted as well.

Also, although FIG. 11 shows a plurality of CCs in a specific small cell, it is equally possible to transmit the discovery signals of a plurality of CCs from a plurality of small cells. In this case, the discovery signals of the same CC may be transmitted synchronously.

Also, although a single user terminal's DS detection duration is configured in FIG. 11, it is equally possible to configure DS detection durations for a plurality of user terminals. In this case, the DS detection durations for a plurality of user terminals are preferably configured in different timings. This is to prevent a plurality of user terminals from detecting small cells at the same timing.

(Structure of Radio Communication System)

Now, a radio communication system according to the present embodiment will be described in detail below. In this radio communication system, the above-described inter-frequency measurement methods of the first and second aspects are employed. Note that although the following radio communication system measures the RSRP as the received power of discovery signals, the RSSI as total received power and the RSRQ as the received quality of discovery signals, these are by no means limiting.

Figure 12:
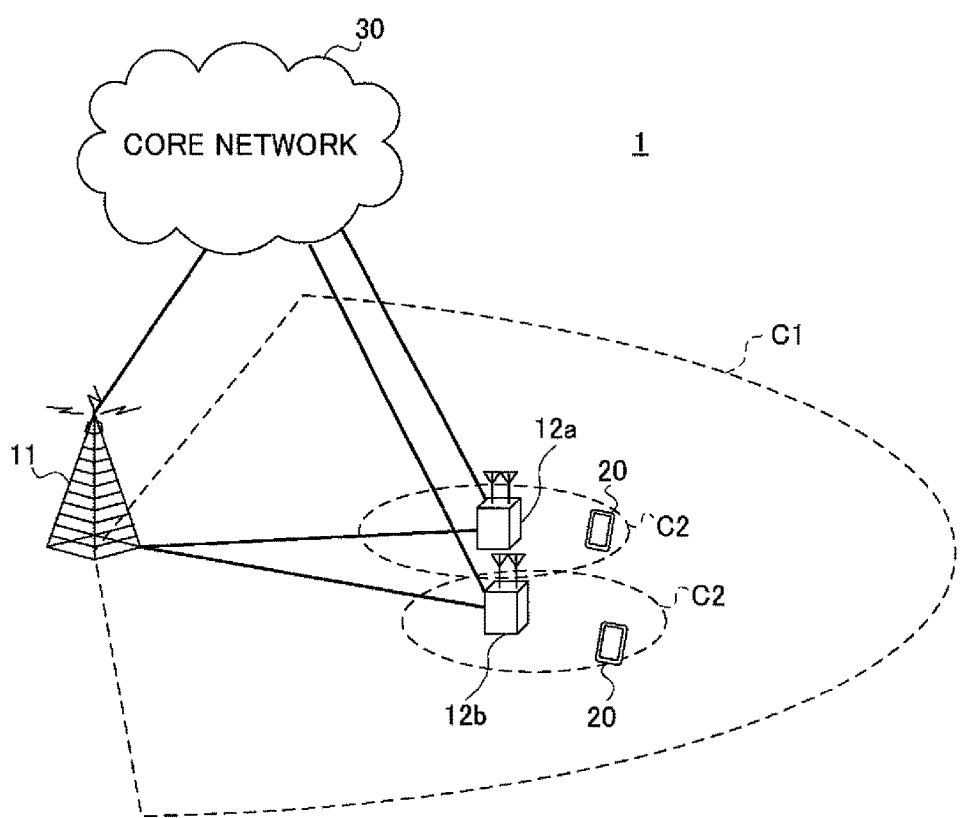
FIG. 12 is a schematic diagram to show an example of a radio communication system according to the present embodiment.

FIG. 12 is a diagram to show a schematic configuration of the radio communication system according to the present embodiment. As shown in FIG. 12, the radio communication system 1 includes a macro base station 11, which forms a macro cell C1, and small base stations 12a and 12b, which are placed within the macro cell C1 and which form small cells C2 that are narrower than the macro cell C1. Also, user terminals 20 are placed in the macro cell C1 and in each small cell C2. Note that the numbers of macro cells C1 (macro base stations 11), small cells C2 (small base stations 12) and user terminals 20 are not limited to those shown in FIG. 12.

Also, the user terminals 20 are placed in the macro cell C1 and each small cell C2. The user terminals 20 are configured to be able to perform radio communication with the macro base station 11 and/or the small base stations 12.

Between the user terminals 20 and the macro base station 11, a relatively low frequency F1 (for example, 2 GHz) is used. On the other hand, between the user terminals 20 and the small base stations 12, relatively high frequency bands F2 to F4 (for example, 3.5 GHz) are used. Note that the frequency bands to use in the macro base station 11 and the small base stations 12 are by no means limited to these.

Also, the macro base station 11 and each small base station 12 may be connected via a channel of relatively low speed such as the X2 interface (non-ideal backhaul), may be connected via a channel of relatively high speed (low delay) such as optical fiber (ideal backhaul), or may be connected via radio. Also, the small base stations 12 may be connected via a channel of relatively low speed such as the X2 interface (non-ideal backhaul), may be connected via a channel of relatively high speed such as optical fiber (ideal backhaul), or may be connected via radio.

The macro base station 11 and the small base stations 12 are each connected with a core network 30. In the core network 30, core network devices such as an MME (Mobility Management Entity), an S-GW (Serving-GateWay), a P-GW (Packet-GateWay) and so on are provided.

Also, the macro base station 11 is a radio base station having a relatively wide coverage, and may be referred to as an "eNodeB," a "macro base station," an "aggregation node," a "transmission point," a "transmitting/receiving point" and so on. The small base stations 12 are radio base stations that have local coverages, and may be referred to as "small base stations," "pico base stations," "femto base stations," "HeNBs (Home eNodeBs)," "RRHs (Remote Radio Heads)," "micro base stations," "transmission points," "transmitting/receiving points" and so on.

Also, if no distinction is made between the macro base station 11 and the small base stations 12, these will be collectively referred to as the "radio base station 10." The user terminals 20 are terminals to support various communication schemes such as LTE and LTE-A, and may not only cover mobile communication terminals, but may also cover stationary communication terminals as well.

Also, in the radio communication system 1, a physical downlink shared channel (PDSCH: Physical Downlink Shared Channel), which is used by each user terminal 20 on a shared basis, physical downlink control channels (PDCCH (Physical Downlink Control Channel) and EPDCCH (Enhanced Physical Downlink Control Channel)), a physical broadcast channel (PBCH) and so on are used as downlink physical channels. User data and higher layer control information are communicated by the PDSCH. Downlink control information (DCI) is communicated by the PDCCH and the EPDCCH.

Also, in the radio communication system 1, a physical uplink shared channel (PUSCH: Physical Uplink Shared Channel), which is used by each user terminal 20 on a shared basis, a physical uplink control channel (PUCCH: Physical Uplink Control Channel) and so on are used as uplink physical channels. User data and higher layer control information are communicated by the PUSCH. Also, by means of the PUCCH, downlink radio quality information (CQI: Channel Quality Indicator), delivery acknowledgement information (ACK/NACK) and so on are communicated.

Figure 13:
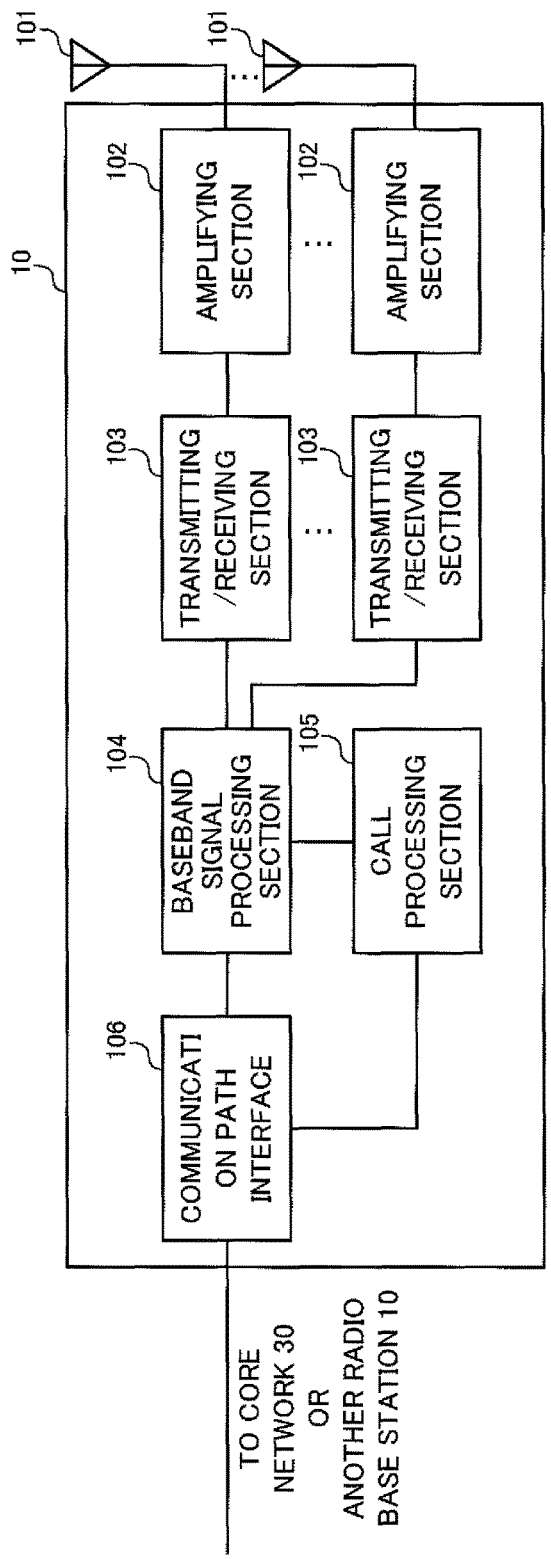
FIG. 13 is a diagram to show an overall structure of a radio base station according to the present embodiment.

Now, overall structures of a radio base station 10 (which may be either a macro base station 11 or a small base station 12) and a user terminal 20 will be described with reference to FIGS. 13 and 14. FIG. 13 is a diagram to show an overall structure of the radio base station 10.

As shown in FIG. 13, the radio base station 10 has a plurality of transmitting/receiving antennas 101 for MIMO communication, amplifying sections 102, transmitting/receiving sections (transmitting section and receiving section) 103, a baseband signal processing section 104, a call processing section 105 and a communication path interface 106.

User data to be transmitted from the radio base station 10 to the user terminal 20 on the downlink is input from the S-GW provided in the core network 30, into the baseband signal processing section 104, via the communication path interface 106.

In the baseband signal processing section 104, a PDCP layer process, division and coupling of user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process and a pre-coding process are performed, and the result is forwarded to each transmitting/receiving section 103. Furthermore, downlink control signals (including reference signals, synchronization signals, broadcast signals, etc.) are also subjected to transmission processes such as channel coding and an inverse fast Fourier transform, and are forwarded to each transmitting/receiving section 103.

Each transmitting/receiving section 103 converts the downlink signals, which are pre-coded and output from the baseband signal processing section 104 on a per antenna basis, into a radio frequency band. The amplifying sections 102 amplify the radio frequency signals having been subjected to frequency conversion, and transmit the signals through the transmitting/receiving antennas 101.

On the other hand, as for uplink signals, radio frequency signals that are received in the transmitting/receiving antennas 101 are each amplified in the amplifying sections 102, converted into baseband signals through frequency conversion in each transmitting/receiving section 103, and input into the baseband signal processing section 104.

In the baseband signal processing section 104, the user data that is included in the input uplink signals is subjected to an FFT process, an IDFT process, error correction decoding, a MAC retransmission control receiving process and RLC layer and PDCP layer receiving processes, and the result is forwarded to the core network 30 via the communication path interface 106. The call processing section 105 performs call processing such as setting up and releasing communication channels, manages the state of the radio base stations 10 and manages the radio resources.

Figure 14:
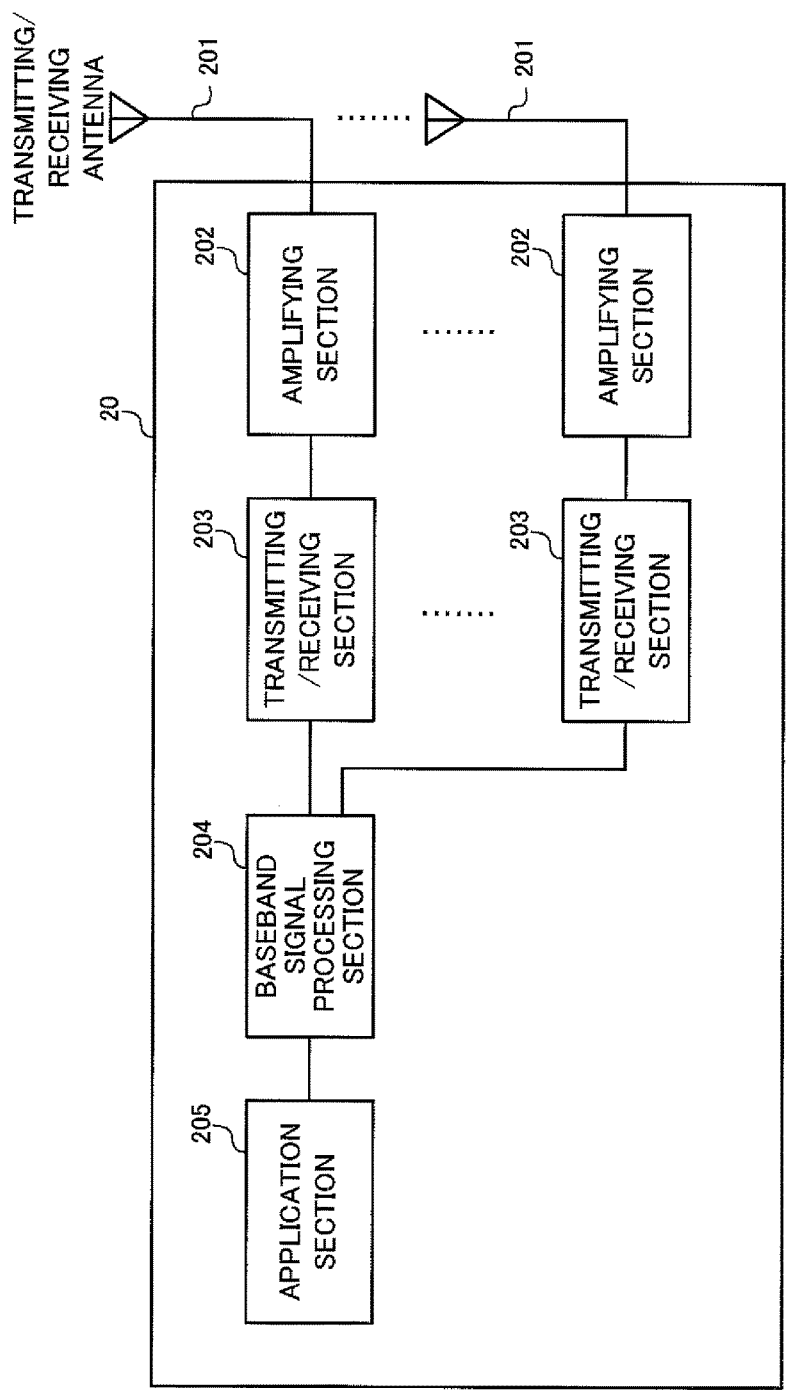
FIG. 14 is a diagram to show an overall structure of a user terminal according to the present embodiment.

FIG. 14 is a diagram to show an overall structure of a user terminal 20 according to the present embodiment. The user terminal 20 has a plurality of transmitting/receiving antennas 201 for MIMO communication, amplifying sections 202, transmitting/receiving sections (receiving section and transmitting section) 203, a baseband signal processing section 204 and an application section 205. Note that the user terminal 20 switches between the frequencies F1 and F2 for receipt by means of one receiving circuit (RF circuit).

As for downlink signals, radio frequency signals that are received in a plurality of transmitting/receiving antennas 201 are each amplified in the amplifying sections 202, subjected to frequency conversion in the transmitting/receiving sections 203, and input in the baseband signal processing section 204. In the baseband signal processing section 204, an FFT process, error correction decoding, a retransmission control receiving process and so on are performed. The user data that is included in the downlink signals is forwarded to the application section 205. The application section 205 performs processes related to higher layers above the physical layer and the MAC layer. Furthermore, the broadcast information in the downlink data is also forwarded to the application section 205.

Meanwhile, uplink user data is input from the application section 205 into the baseband signal processing section 204. The baseband signal processing section 204 performs a retransmission control (HARQ (Hybrid ARQ)) transmission process, channel coding, pre-coding, a DFT process, an IFFT process and so on, and the result is forwarded to each transmitting/receiving section 203. Baseband signals that are output from the baseband signal processing section 204 are converted into a radio frequency band in the transmitting/receiving sections 203. After that, the amplifying sections 202 amplify the radio frequency signals having been subjected to frequency conversion, and transmit the result from the transmitting/receiving antennas 201.

Next, functional structures of a macro base station 11, a small base station 12 and a user terminal 20 will be described in detail with reference to FIG. 15 to FIG. 17. The functional structures of the macro base station 11 shown in FIG. 15 and the small base station 12 shown in FIG. 26 are primarily formed with the baseband signal processing section 104. Also, the functional structure of the user terminal 20 shown in FIG. 17 is primarily formed with the baseband signal processing section 204.

Figure 15:
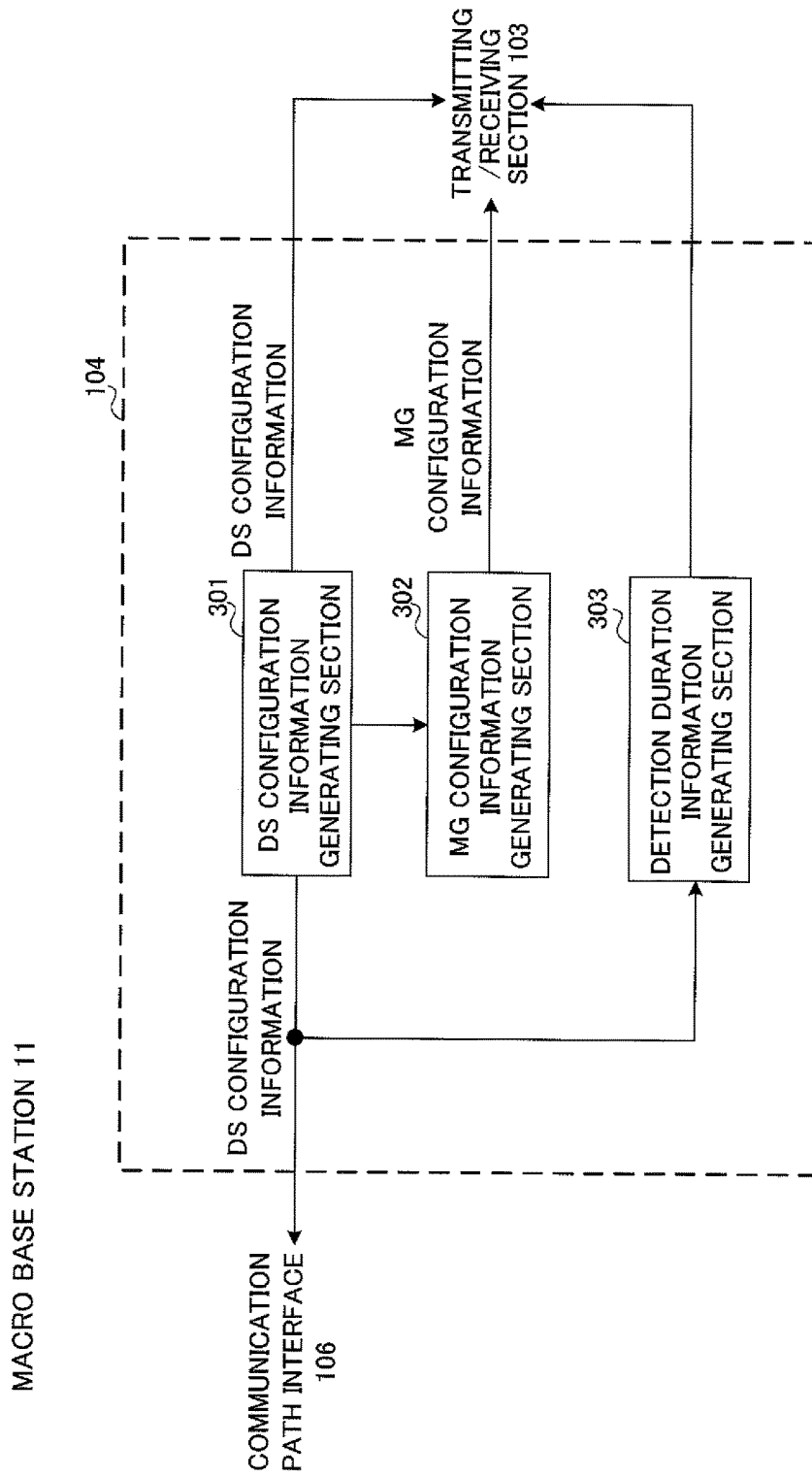
FIG. 15 is a diagram to show a functional structure of a macro base station according to the present embodiment.

FIG. 15 is a diagram to show a functional structure of a macro base station 11 according to the present embodiment. As shown in FIG. 15, the macro base station 11 has a DS configuration information generating section 301 (generating section), an MG configuration information configuration section 302 and a detection duration information generating section 303. Note that the detection duration information generating section 303 may be omitted in the first aspect of the present invention.

The DS configuration information generating section 301 generates discovery signal (DS) configuration information. Here, the DS configuration information refers to information about discovery signals, and includes, for example, information about the transmission timings of discovery signals, the timing shift value for the discovery signal of each CC, the sequence pattern of discovery signals and so on. As mentioned earlier, the transmission timing information may include at least one of the DS transmission cycle, the DS transmission durations and the DS starting offsets.

Note that the DS transmission cycle may be the same as the period of measurement gaps (MGRP), or may be a longer period than MGRP. Also, the DS transmission cycle may be configured to be a multiple of MGRP (for example, 40 ms, 80 ms, etc.) (for example, 160 ms, which is four times bigger).

The DS configuration information generating section 301 output the generated DS configuration information to the transmitting/receiving sections 103. The DS configuration information may be reported to the user terminal 20 through higher layer signaling such as RRC signaling, or may be reported as cell-specific information. Also, the DS configuration information may be reported to the small base stations 12 serving under the macro base station 11, via the communication path interface 106.

The MG configuration information generating section 302 generates measurement gap (MG) configuration information. The MG configuration information is information that is used to configure measurement gaps in the user terminal 20. Here, the MG configuration information may include the length of time of measurement gaps (MGL) and the period of measurement gaps (MGRP), or include a pattern identifier (gap pattern ID) that identifies the combination of MGL and MGRP. Also, the MG configuration information may include measurement gap offsets (gap offsets). The offsets may show the starting locations of measurement gaps, and may be, for example, subframe numbers.

To be more specific, the MG configuration information generating section 302 generates MG configuration information based on transmission timing information and timing shift values generated in the DS configuration information generating section 301. For example, the MG configuration information generating section 302 may configure the starting locations (offsets) of the measurement gaps for the user terminal 20 so that the transmission timings of part (at least two) or all of a plurality of CCs (frequencies) employed in the small cell C2 are included.

The MG configuration information generating section 302 outputs the generated MG configuration information to the transmitting/receiving section 103. The MG configuration information is reported to the user terminal 20 through higher layer signaling such as RRC signaling.

The detection duration information generating section 303 generates detection duration information, which represents discovery signal (DS) detection durations (second aspect). As mentioned earlier, the detection duration information includes at least one of the length of time of DS detection durations, the period of DS detection durations and the starting offsets of DS detection durations. Note that the length of time of DS detection durations may be configured based on the length of time of DS transmission durations and the time to switch the receiving frequency. The period of DS detection durations may be the same as the DS transmission cycle.

Figure 16:
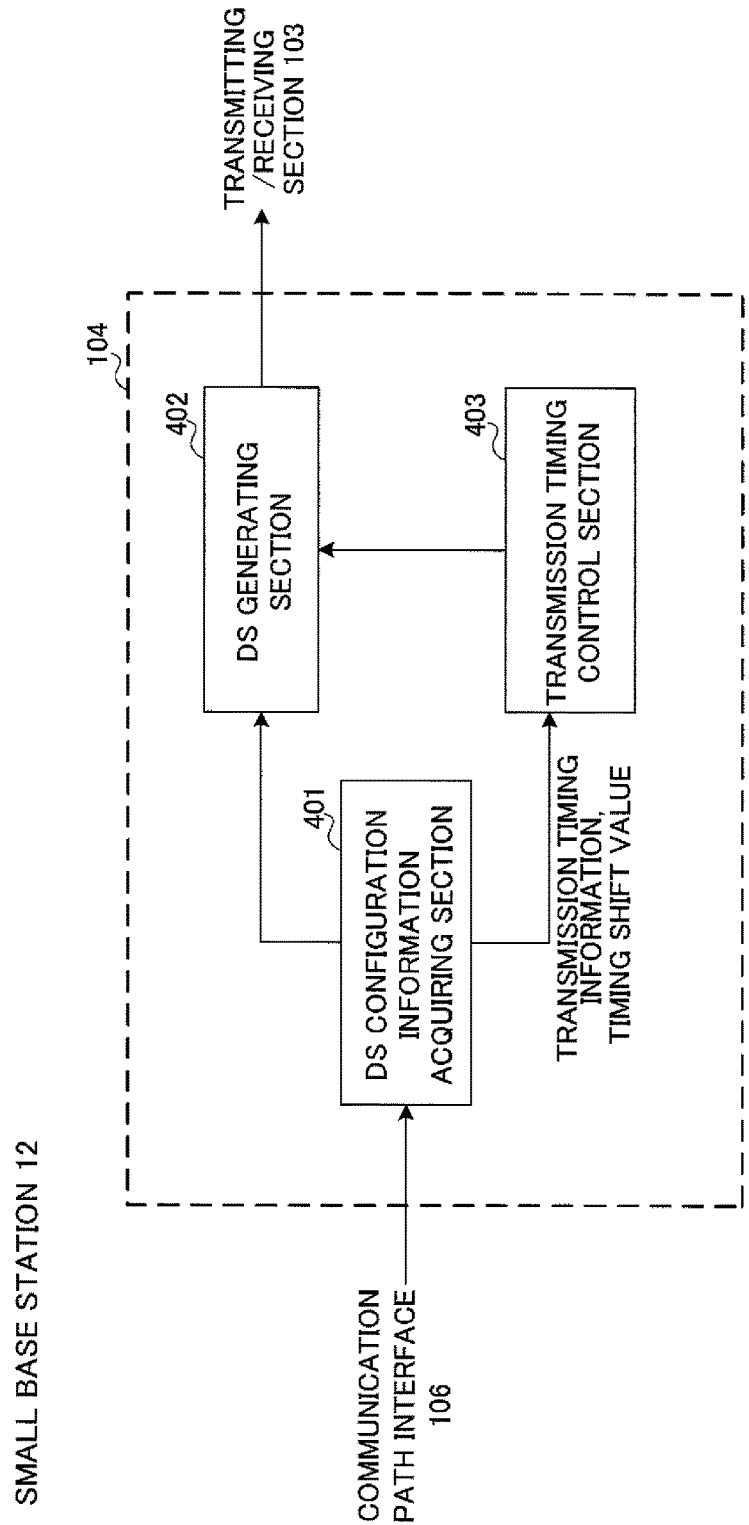
FIG. 16 is a diagram to show a functional structure of a small base station according to the present embodiment.
Figure 17:
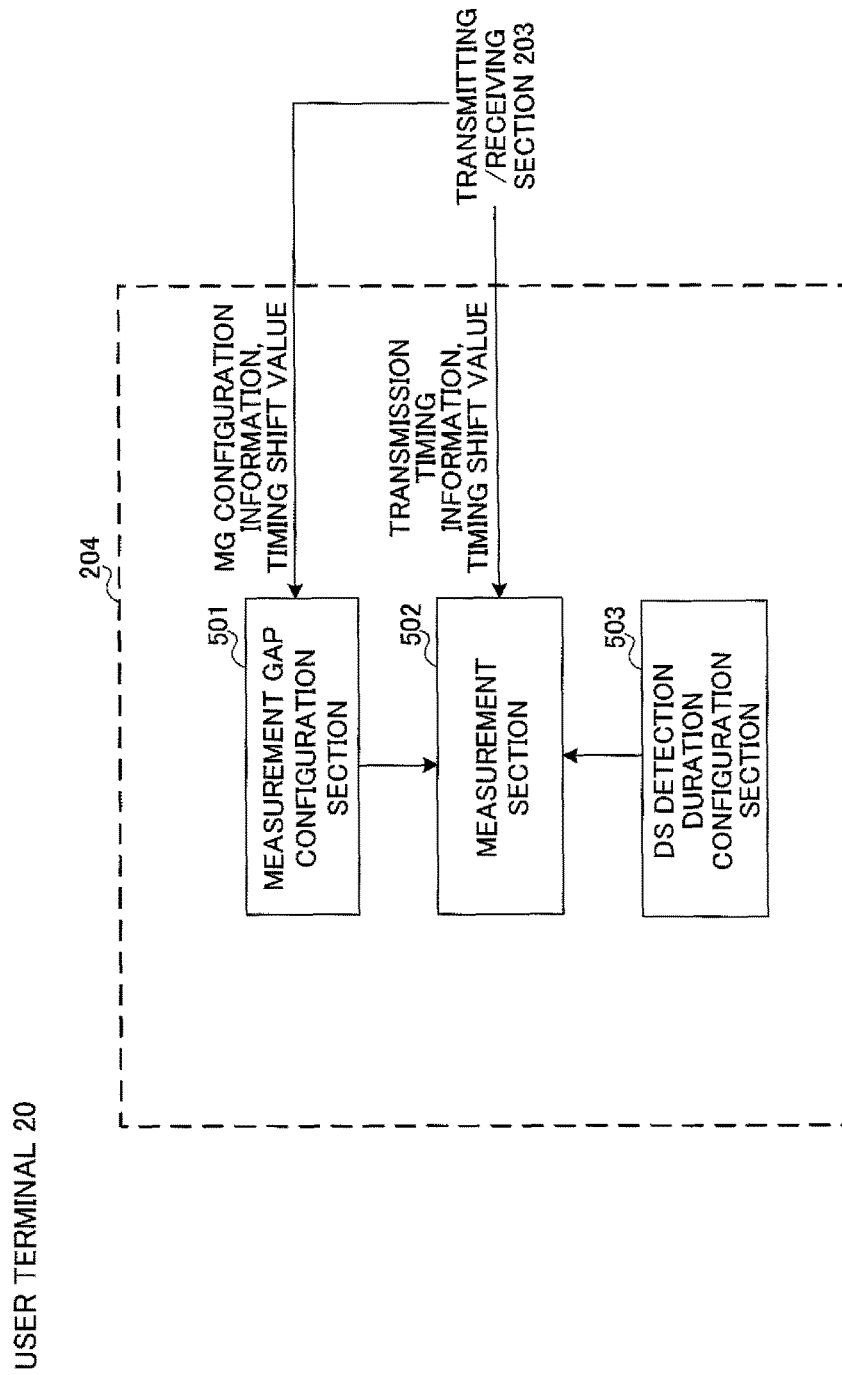
FIG. 17 is a diagram to show a functional structure of a user terminal according to the present embodiment.

FIG. 16 is a diagram to show a functional structure of a small base station 12 according to the present embodiment. As shown in FIG. 16, the small base station 12 has a DS configuration information acquiring section 401, a DS generating section 402 and a transmission timing control section 403.

The DS configuration information acquiring section 401 acquires DS configuration information from the macro base station 11 via the communication path interface 106 and outputs this to the DS generating section 402. Also, the DS configuration information acquiring section 401 may output the above transmission timing information and timing shift values to the transmission timing control section 403.

The DS generating section 402 generates discovery signals and maps these signals to predetermined radio resources (for example, time resources such as subframes and OFDM symbols and frequency resources such as resource blocks).

To be more specific, the DS generating section 402 generates discovery signals, on a per CC basis, for a plurality of CCs (frequencies) that can be used. Note that the DS generating section 402 generates the discovery signals of on-state CCs, without generating the discovery signals of off-state CCs.

The transmission timing control section 403 controls the transmission timings of the discovery signals generated in the DS generating section 402. To be more specific, based on the transmission timing information and the timing shift values reported from the macro base station 11, the transmission timing control section 403 determines the transmission timings of the discovery signal of each CC. The transmission timing control section 403 controls the DS generating section 402 to map each CC's discovery signal to the time resources at the determined transmission timings (for example, subframes, OFDM symbols, etc.).

FIG. 17 is a diagram to show a functional structure of a user terminal 20 according to the present embodiment. As shown in FIG. 17, the user terminal 20 has a measurement gap configuration section 501, a measurement section 502 and a DS detection duration configuration section 503. Note that the DS detection duration configuration section 503 may be omitted in the first aspect of the present invention.

The measurement gap configuration section 501 configures measurement gaps based on MG configuration information from the macro base station 11. To be more specific, the measurement gap configuration section 501 configures MGL and MGRP measurement gaps by using gap offsets. This MG configuration information is received in the transmitting/receiving section 203, from the macro base station 11, and input in the measurement gap configuration section 501.

Also, the measurement gap configuration section 501 may shift the measurement gaps based on timing shift values from the macro base station 11. By this means, it is possible to change the combination of CCs to measure between the measurement gaps before the shift and the measurement gaps after the shift (see FIG. 7).

Also, the measurement gap configuration section 501 may expand the measurement gaps based on timing shift values from the macro base station 11 (see FIG. 8). To be more specific, the measurement gap configuration section 501 may make the length of time of measurement gaps (MGL) so that all CCs (frequencies) can be monitored. By this means, even if the number of CCs to monitor increases, it is still possible to monitor all CCs in one measurement gap.

The measurement section 502 measures a plurality of CCs (frequencies) in the measurement gaps configured in the measurement gap configuration section 501. As mentioned earlier, measurements of a plurality of CCs may include at least one of the process of detecting small cells by using the discovery signals of a plurality of CCs, and the process of measuring the RSRPs, RSRQs and RSSIs of these plurality of CCs.

To be more specific, the measurement section 502 may measure the RSRPs of a plurality of CCs (the received power of the discovery signals) in measurement gaps. Also, when the discovery signals of a plurality of CC are not transmitted in measurement gaps, the measurement section 502 may measure the RSSIs of these plurality of CCs. Also, when the discovery signals of a plurality of CCs are transmitted in measurement gaps, the measurement section 502 may measure the RSSIs of these plurality of CCs.

Also, in DS detection durations configured in the DS detection duration configuration section 503, the measurement section 502 may measure the RSRP of a specific CC (the received power of the discovery signal) (second aspect). In this case, the measurement section 502 may assume, without measurements, that the received power (RSRP) of the discovery signals of the other CCs is the same as the received power (RSRP) of the discovery signal of the specific CC measured. By this means, it is possible to reduce the load of measurements in the user terminal compared to the case of measuring the received power (RSRP) of the discovery signals of all CCs.

The DS detection duration configuration section 503 configures DS detection durations, apart from the measurement gaps, based on detection duration information from the macro base station 11 (second aspect).

With the radio communication system 1 according to the present embodiment, it is possible to reduce the load of inter-frequency measurements in the user terminal 20. To be more specific, transmission timing information and timing shift values are transmitted from the macro base station 11, so that the user terminal 20 can measure a plurality of CCs in one measurement gap, and therefore it is possible to reduce the load of the user terminal (the first aspect).

Note that, in the radio communication system 1, transmission timing information, DS configuration information including timing shift values, and detection duration information are reported from the macro base station 11 to the user terminal 20, but these pieces of information may be reported from any device on the network side (for example, small base stations 12, etc.).

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention. That is to say, the description herein is provided only for the purpose of explaining examples, and should by no means be construed to limit the present invention in any way.

The disclosure of Japanese Patent Application No. 2013-199191, filed on Sep. 26, 2013, including the specification, drawings and abstract, is incorporated herein by reference in its entirety.

The invention claimed is:

1. A user terminal in a radio communication system in which a plurality of component carriers (CCs) are used in a small cell within a macro cell, the user terminal comprising:
   a receiver that receives, from a radio base station forming the macro cell, transmission timing information of a detection signal in the small cell, and a timing shift value for detection signals per CC of the plurality of CCs that are transmitted with shifted timings in the small cell; and
   a processor that measures a total received power per CC of the plurality of CCs in a measurement gap, in which detection signals per CC of the plurality of CCs are either transmitted or not transmitted, based on the transmission timing information and the timing shift value.

2. The user terminal according to claim 1, wherein the processor measures received power of the detection signals per CC of the plurality of CCs in the measurement gap, in which detection signals per CC of the plurality of CCs are transmitted.

3. The user terminal according to claim 2, wherein:
   the receiver receives measurement gap configuration information from the radio base station; and
   the measurement gap is configured based on the measurement gap configuration information.

4. The user terminal according to claim 2, wherein the measurement gap is shifted based on the timing shift value.

5. The user terminal according to claim 2, wherein:
   the small cell comprises a plurality of small cells; and
   between the plurality of small cells, detection signals of a same CC are transmitted synchronously.

6. The use terminal according to claim 1, wherein:
   the receiver receives measurement gap configuration information from the radio base station; and
   the measurement gap is configured based on the measurement gap configuration information.

7. The user terminal according to claim 1, wherein the measurement gap is shifted based on the timing shift value.

8. The user terminal according to claim 1, wherein:
   the small cell comprises a plurality of small cells; and
   between the plurality of small cells, detection signals of a same CC are transmitted synchronously.

9. The user terminal according to claim 8, wherein at least one of the detection signals of the plurality of CCs is transmitted in each of the plurality of small cells.

10. The user terminal according to claim 1, wherein:
    the receiver receives measurement gap configuration information from the radio base station; and
    the measurement gap is configured based on the measurement gap configuration information.

11. The user terminal according to claim 1, wherein the measurement gap is shifted based on the timing shift value.

12. The user terminal according to claim 1, wherein:
    the small cell comprises a plurality of small cells; and
    between the plurality of small cells, detection signals of a same CC are transmitted synchronously.

13. A radio base station that forms a macro cell in a radio communication system in which a plurality of component carriers (CCs) are used in a small cell within the macro cell, the radio base station comprising:
    a processor that generates transmission timing information of a detection signal in the small cell, and a timing shift value for detection signals per CC of the plurality of CCs that are transmitted with shifted timings in the small cell; and
    a transmitter that transmits the transmission timing information and the timing shift value to a user terminal,
    wherein the total received power per CC of the plurality of CCs is measured in a measurement gap, in which detection signals per CC of the plurality of CCs are either transmitted or not transmitted, based on the transmission timing information and the timing shift value.

14. An inter-frequency measurement method in a radio communication system in which a plurality of component carriers (CCs) are used in a small cell within a macro cell, the inter-frequency measurement method comprising the steps of:
    from a radio base station forming the macro cell to a user terminal, transmitting transmission timing information of a detection signal in the small cell, and a timing shift value for detection signals per CC of the plurality of CCs that are transmitted with shifted timings in the small cell; and
    in the user terminal, measuring a total received power per CC of the plurality of CCs in a measurement gap, in which detection signals per CC of the plurality of CCs area either transmitted or not transmitted, based on the transmission timing information and the timing shift value.

* * * * *